United States Patent [19]

Nagasawa et al.

[11] Patent Number: 4,988,283

[45] Date of Patent: Jan. 29, 1991

[54] FUEL CELL POWER GENERATING APPARATUS AND METHOD FOR CONTROLLING THE APPARATUS

[75] Inventors: Makoto Nagasawa; Hideyuki Miwa, both of Kawasaki, Japan

[73] Assignee: Fuji Electric Co., Ltd., Kawasaki, Japan

[21] Appl. No.: 415,330

[22] PCT Filed: Jan. 13, 1989

[86] PCT No.: PCT/JP89/00030

§ 371 Date: Sep. 12, 1989

§ 102(e) Date: Sep. 12, 1989

[87] PCT Pub. No.: WO89/06866

PCT Pub. Date: Jul. 27, 1989

[30] Foreign Application Priority Data

| Jan. 14, 1988 | [JP] | Japan | 63-4901 |
| Jan. 14, 1988 | [JP] | Japan | 63-4902 |
| Jan. 14, 1988 | [JP] | Japan | 63-4903 |
| Jan. 14, 1988 | [JP] | Japan | 63-4904 |
| Apr. 6, 1988 | [JP] | Japan | 63-83083 |

[51] Int. Cl.$^5$ .................................................. H01M 8/04
[52] U.S. Cl. ........................................ 429/17; 429/19; 429/23
[58] Field of Search ............................. 429/17, 19, 23

[56] References Cited

U.S. PATENT DOCUMENTS 3,745,047 7/1973 Fanciullo et al. .................... 429/23

Primary Examiner—Donald L. Walton
Attorney, Agent, or Firm—Spencer & Frank

[57] ABSTRACT

An electric power supplied to an electric load (24) is determined and the current ($i_{FC}$) outputted from a fuel cell part (7) is controlled in accordance with a load power signal (701) which corresponds to the detected result. A fuel cell output following the variation of the power load (24) can be obtained by controlling the amounts of a starting material (41) to be reformed, a reformed fuel (42) and an air (43) to be supplied based on this output current. When the power load (24) is at a low level, the foregoing output from the fuel cell is also supplied to a heating portion (10) for heating the fuel cell part so as not to reduce the current ($i_{FC}$) outputted from the fuel cell part. Since the output current is not reduced, it is possible to prevent an extreme increase in the electrode voltage of the fuel cell part (7) and hence the deterioration of the electrode is reduced.

35 Claims, 16 Drawing Sheets

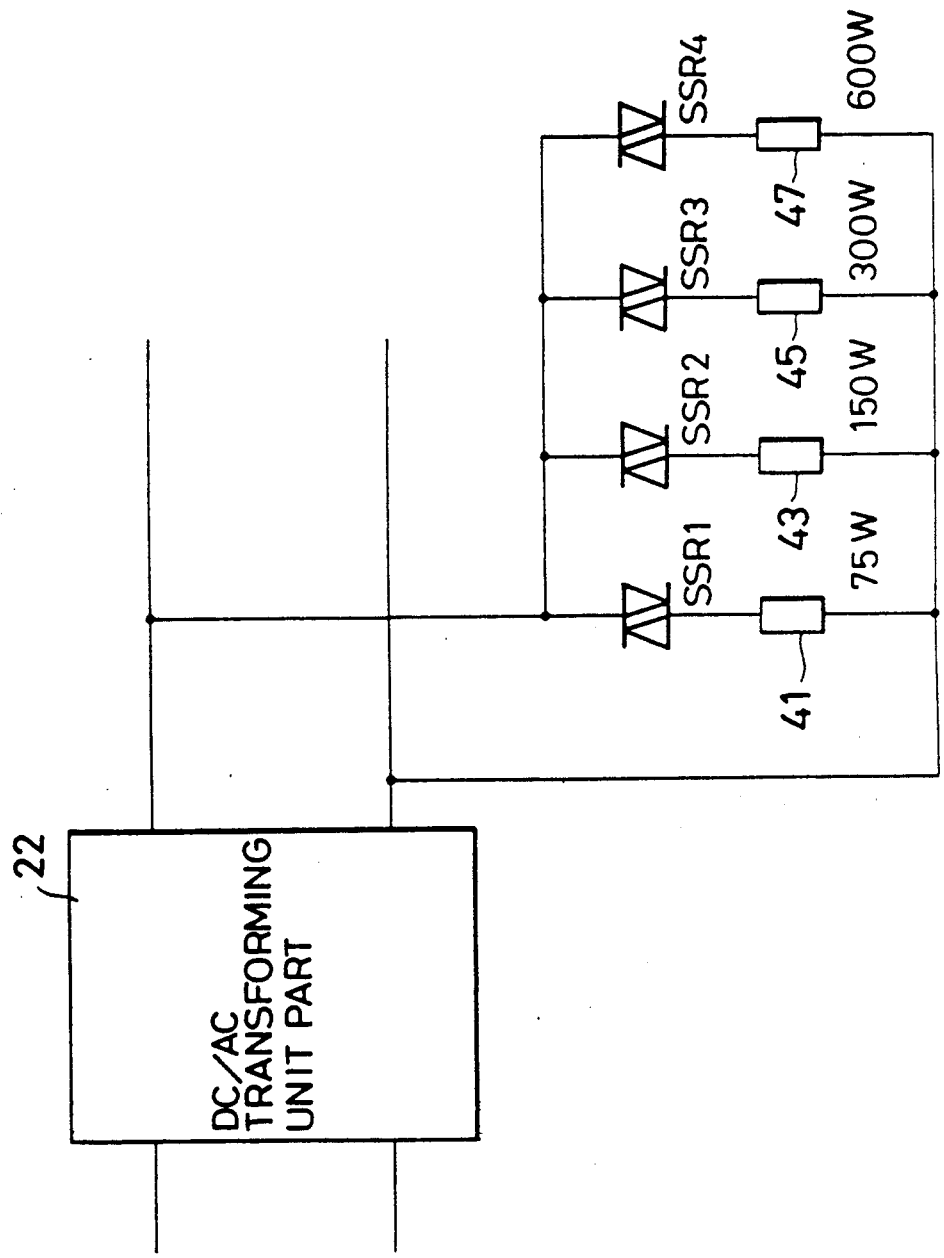

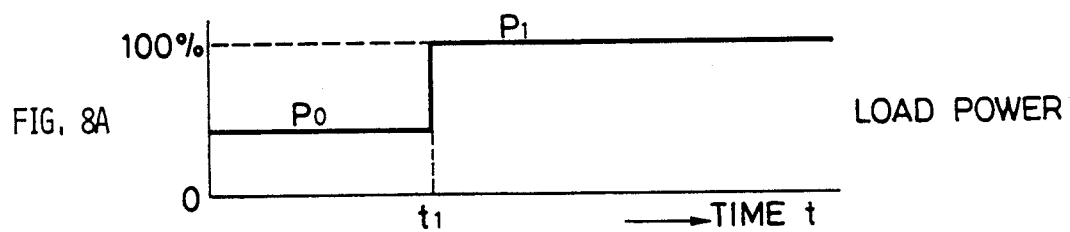
FIG. 8A — LOAD POWER
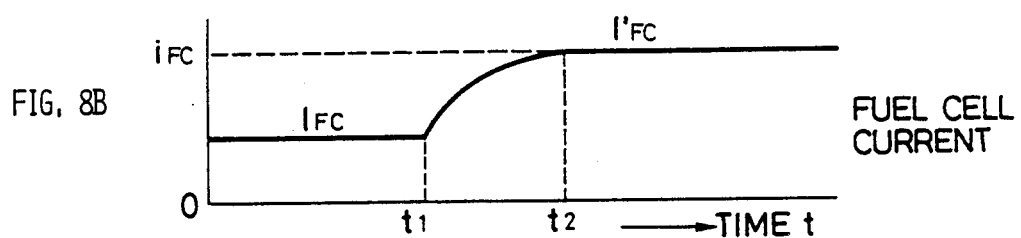
FIG. 8B — FUEL CELL CURRENT
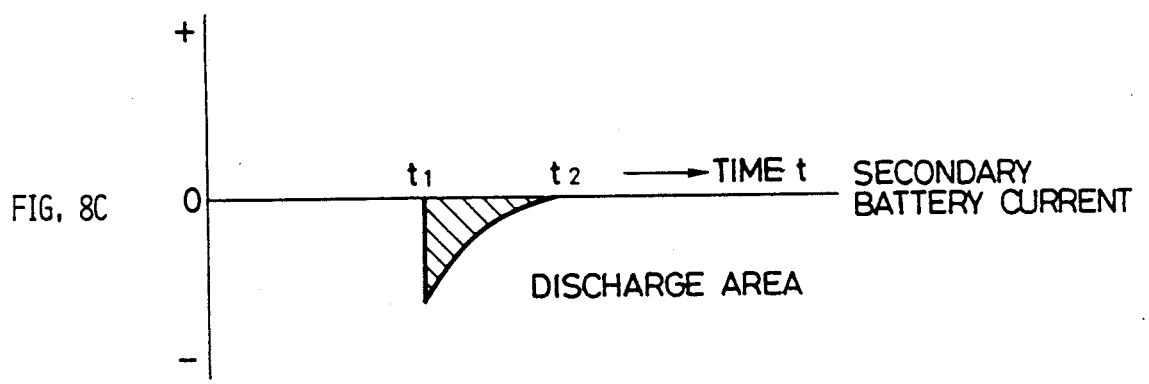
FIG. 8C — SECONDARY BATTERY CURRENT
DISCHARGE AREA

FUEL CELL POWER GENERATING APPARATUS AND METHOD FOR CONTROLLING THE APPARATUS

FIELD OF THE INVENTION

The present invention relates to a fuel cell power generating apparatus and a method for controlling the apparatus and more specifically to a fuel cell power generating apparatus in which the power of the fuel cell can be controlled in proportion to changes in electric power load and a method for controlling the same.

BACKGROUND ART

In general, in a fuel cell power generating apparatus which utilizes hydrogen obtained by reforming, for instance, a hydrocarbon with a fuel reforming apparatus, particularly a small-sized AC fuel cell power generating apparatus for supplying power to an electric power load which causes vigorous variation, it is required to increase or decrease the feed rate of a starting material to be reformed such as hydrocarbons, which is fed to the fuel reforming apparatus, and that of a fuel air to be fed to the fuel cell portion depending on the increase or decrease of the electric power load.

In addition, a reforming catalyst for promoting a reforming reaction is filled in the fuel reforming apparatus and, therefore, a fuel for heating the reforming catalyst must be used. The feed rate of auxiliary combustion air for burning the fuel for heating must also be increased or decreased depending on the increase or decrease in the feed rate of the fuel for heating. In the fuel reforming apparatus, it is necessary to maintain the temperature in the reforming apparatus at a predetermined level to increase reforming efficiency of a starting material to be reformed and a extend the life time of the reforming catalyst.

On the other hand, the fuel cell portion suffers from a loss L represented by the following equation (1):

$$L = KI^2 \quad (1)$$

wherein I is an electric current outputted from the cell portion and K represents a proportionality factor.

Since the temperature of electrodes rises due to the loss L, usually the electrodes of the fuel cell are cooled with air so as not to cause an extreme increase in their temperature. Moreover, since, in the fuel cell portion, the temperature of the cell electrodes must be held at a predetermined level for achieving a good power generation efficiency, the fuel cell power generating apparatus should be controlled so that an electric current outputted from the cell portion and the feed rate of air for cooling the fuel cell portion are increased or decreased depending on the increase or decrease in the temperature of the fuel cell portion.

However, a conventional small-sized AC-fuel cell power generating apparatus for supplying electric power to an electric load which causes vigorous variation as in, for instance, a heater or an inverter air conditioner is not provided with a function for automatically increasing or decreasing the feed rate of a starting material for reforming and that of air to be fed to various apparatuses depending on the increase or decrease in the electric load or the like. Therefore, the conventional fuel cell power generating apparatus exhibits low load follow-up properties.

When the fuel cell is started and the electric load is in a very low level of the order of zero load such as those observed when a load is reduced to a low level, a current inversely passes through the fuel cell if the voltage of the electrodes of the fuel cell portion becomes extremely high. Therefore, another serve problem of deteriorating the electrodes, for instance, corrosion of an electrode catalyst such as platinum arises.

DISCLOSURE OF THE INVENTION

Accordingly, an object of the present invention is to solve the foregoing problems and to provide a fuel cell power generating apparatus having a function for automatically increasing or decreasing the feed rate of a starting material to be reformed and that of air to be supplied to various apparatuses depending on variation in electric load or the like and a function for preventing an increase in the electrode voltage even when an electric load is in a low level of the order of almost zero.

In the first aspect of the present invention, a fuel cell power generating apparatus which comprises a fuel cell, a fuel reforming portion for generating a reformed fuel to be supplied to the fuel cell and a heating portion for heating the fuel cell, the fuel cell generating apparatus, comprises:

a first detecting means for detecting power supplied to a load;

an operational control means for operating an electric current command signal for leading out an electric current from the fuel cell based on a first detected signal outputted from the first detecting means; and a second detecting means for detecting an electric current outputted from the fuel cell based on the electric current command signal;

thereby the flow rate of a material which is fed to the fuel reforming portion to produce the reformed fuel being controlled on the basis of a control signal obtained by processing a second signal detected by the second detecting means with the processing means and an electric power being supplied to the heating portion on the basis of the first signal detected by the first detecting means.

Here, the first detecting means may comprise an output voltage detecting part for detecting a voltage between both ends of the load, an output current detecting part for detecting a current passing through the load and a load power processing part.

The load power processing part may be in the form of an AC transducer.

The output current detecting part may be in the form of a Hall CT.

The output current detecting part may be in the form of or a shunt.

The second detecting means may be in the form of a Hall CT.

The control of the flow rate of the material for producing the reformed fuel may be performed by a controlling means which comprises an operating device, a pulse width modulator and a power element.

The operating device may comprise a function generator in the form of a CPU, an operational amplifier and a resistor.

In the second aspect of the present invention, a fuel cell power generating apparatus which comprises a fuel cell, a fuel reforming portion for generating a reformed gas to be supplied to the fuel cell and a heating portion for heating the fuel cell, the fuel cell generating apparatus, comprises:

a first detecting means for detecting power supplied to a load;

an operational control means for operating an electric power command signal for leading out an electric power from the fuel cell based on a first signal detected by the first detecting means; and a current operating means for operating a current command signal for use in leading out a current from the fuel cell based on the electric power command signal;

thereby the flow rate of a material which is fed to the fuel reforming portion to produce the reformed fuel being controlled on the basis of a control signal obtained by processing a current command signal operated by the current operating means with the processing means and an electric power being supplied to the heating portion on the basis of the first signal detected by the first detecting means.

Here, the first detecting means may comprise an output voltage detecting part for detecting a voltage between both ends of the load, an output current passing through the load and a load power processing part.

The load power processing part may be in the form of an AC transducer.

The output current detecting part may be in the form of a Hall CT.

The output current detecting part may be in the form of a shunt.

The current operating means may be in the form of a divider.

The control of the flow rate of the material for producing the reformed fuel may be performed by a controlling means which comprises an operating device, a pulse width modulator and a power element.

The operating device may comprise a function generator in the form of a CPU, an operational amplifier and a resistor.

In the third aspect of the present invention, a method for controlling a fuel cell power generating apparatus comprising a fuel cell, a fuel reforming portion for generating a reformed fuel to be supplied to the fuel cell and a heating portion for heating the fuel cell, comprises the steps of:

a first detecting step for detecting an electric power supplied to a load;

controlling an operation of a current command signal for leading out a current from the fuel cell on the basis of a first signal detected by the first detecting means; and a second detecting step for detecting a current outputted from the fuel cell based on the current command signal;

thereby a flow rate of a material which is fed to the fuel reforming portion to produce the reformed fuel being controlled on the basis of a control signal obtained by processing a second signal detected by the second detecting step through the processing step and an electric power being supplied to the heating portion on the basis of the first signal detected through the first detecting step.

Here, the first detecting step may comprise a detecting step by means of an output voltage detecting part for detecting the voltage across the load, a detecting step by means of an output current detecting part for detecting a current passing through the load and an operating step by means of a load power operating part.

The load power operating part may be in the form of an AC transducer.

The output current detecting part may be in the form of a Hall CT.

The output current detecting part may be in the form of a shunt.

The detecting means in the second detecting step may be in the form of a Hall CT.

A control of a flow rate of the material for producing the reformed fuel may perform by a controlling means which comprises an operating device, a pulse width modulator and a power element.

The operating device may comprise a function generator in the form of a CPU, an operational amplifier and a resistor.

In the forth aspect of the present invention, a method for controlling a fuel cell power generating apparatus comprising a fuel cell, a fuel reforming portion for generating a reformed gas to be supplied to the fuel cell and a heating portion for heating the fuel cell, comprises the steps of:

a first detecting step for detecting an electric power supplied to a load;

an operational control step for operating an electric power command signal for outputting an electric power from the fuel cell on the basis of a first signal detected by the first detecting step; and operating a current command signal for leading out a current from the fuel cell based on the electric power command signal;

thereby the flow rate of a material which is fed to the fuel reforming portion to produce the reformed fuel being controlled on the basis of a control signal obtained by operating the current command signal processed by the current operating means through the processing step and an electric power being supplied to the heating portion on the basis of the first signal detected through the first detecting step.

Here, the first detecting step may comprise a detecting step by means of an output voltage detecting part for detecting a voltage across the detecting step by means of an output current detecting part for detecting a current passing through the load and an operating step by means of a load power operating part.

The load power operating part may be in the form of an AC transducer.

The output current detecting part may be in the form of a Hall CT.

The output current detecting part may be in the form of a shunt.

The current operating means may be in the form of a divider.

A control of a flow rate of the material for producing the reformed fuel may be performed by a controlling means which comprises an operating device, a pulse width modulator and a power element.

The operating device may comprise a function generator in the form of a CPU, an operational amplifier and a resistor.

In the fifth aspect of the present invention, a method for controlling a fuel cell to which a reformed fuel is supplied, comprises the steps of:

outputting an electric power to a heating portion for heating the fuel cell and simultaneously computing a current outputted from the fuel cell based on a predetermined electric power and an electric power for charging a secondary battery when the value obtained by subtracting an electric power supplied to a load from the predetermined power based on properties of the fuel cell is positive;

computing a current outputted from the fuel cell on the basis of the electric power supplied to the load and the power for charging the secondary battery which backs up the fuel cell when the subtraction value is not positive; and supplying, to a fuel reforming device, a material for producing a fuel corresponding to the calculated value, for supplying an electric power outputted from the fuel cell to the secondary battery and for controlling the cell so that an output therefrom becomes not less than the predetermined electric power.

In the sixth aspect of the present invention, a method for controlling a fuel cell to which a reformed fuel is supplied, comprises the steps of:

outputting an electric power to a heating portion for heating the fuel cell and simultaneously computing a current outputted from the fuel cell based on a predetermined electric power when the value obtained by subtracting an electric power supplied to a load from the predetermined power based on properties of the fuel cell is positive;

computing a current outputted from the fuel cell on the basis of the electric power supplied to the load when the subtraction value is not positive; and supplying a material for producing a fuel to a fuel reforming device corresponding to the calculated value and for controlling the fuel cell so that an output therefrom becomes not less than the predetermined electric power.

In the seventh aspect of the present invention, a method for controlling a fuel cell to which a reformed fuel is supplied, comprises the steps of:

computing a current outputted from the fuel cell from a predetermined electric power based on properties of the fuel cell; and supplying a material for producing a fuel corresponding to the calculated value and for calculating an electric power outputted to a heating portion for heating the fuel cell based on a predetermined electric power and an electric power for charging a secondary battery which back up the fuel cell; and, during steady operation;

outputting an electric power to the heating portion and simultaneously calculating an output current of the fuel cell on the basis of a predetermined electric power and the power for charging the secondary battery when the subtraction value obtained by subtracting an electric power supplied to a load from the predetermined power is positive;

while if the subtraction value is not positive, the method comprising a step of calculating an output current of the fuel cell based on the power supplied to the load and the power for charging the secondary battery; and supplying a material for producing a fuel to a fuel reforming device corresponding to the calculated value, for supplying the output power from the fuel cell to the secondary battery and for controlling the fuel cell so that an output therefrom becomes not less than the predetermined electric power.

BRIEF DESCRIPTION OF THE DRAWINGS

FIG. 5 is a diagram illustrating the construction of an AC heater control part and an AC heater portion;

FIGS. 8A, 8B and 8C are diagrams showing variations of load power, fuel cell current and secondary battery voltage, with time, of the control method shown in FIG. 7;

BEST MODE FOR CARRYING OUT THE INVENTION

The present invention will hereunder be explained in more detail with reference to the attached drawings.

Figure 1A:
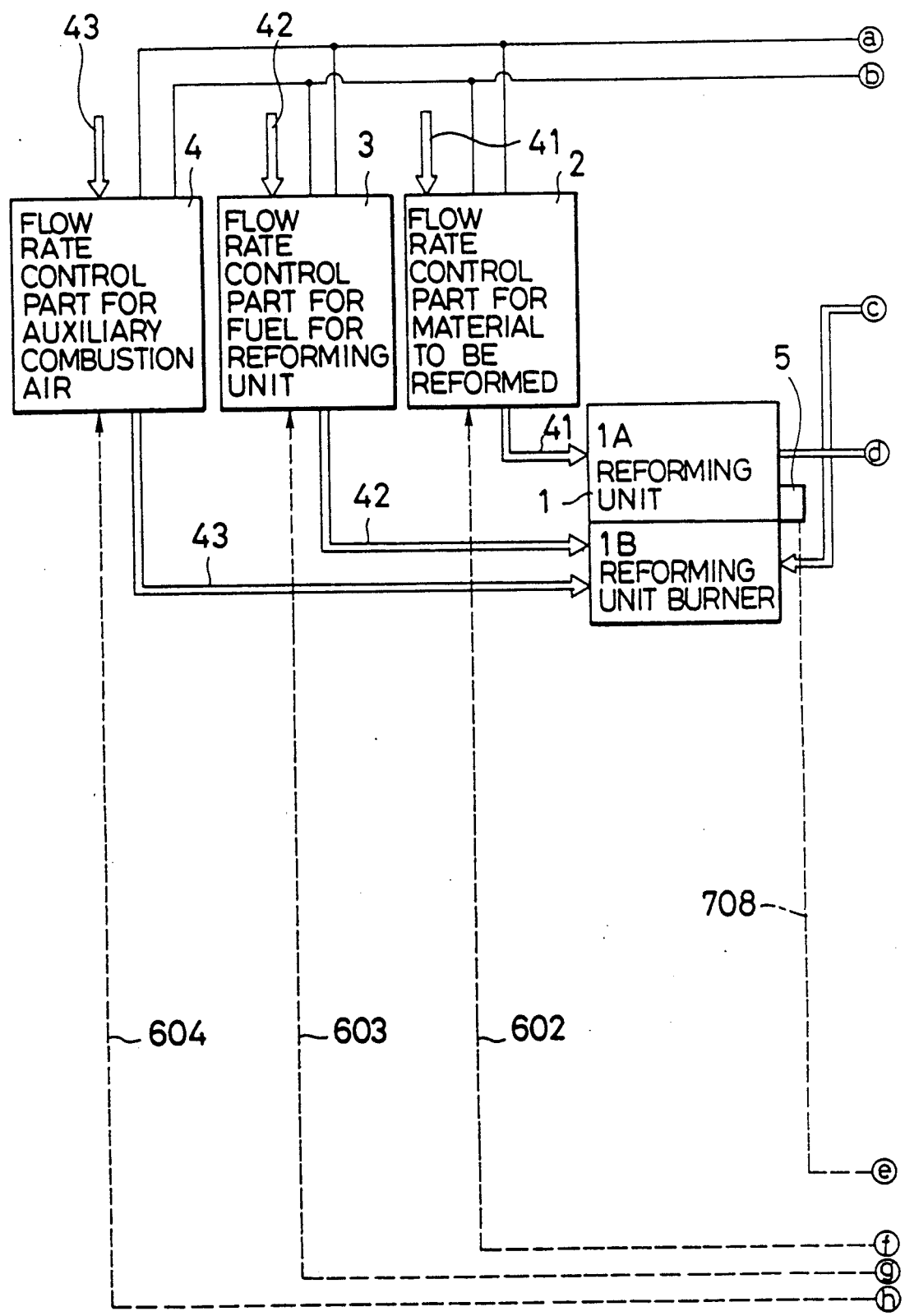
FIGS. 1A, 1B and 1C are block diagrams for illustrating an embodiment of the fuel cell power generating apparatus according to the present invention.
Figure 1B:
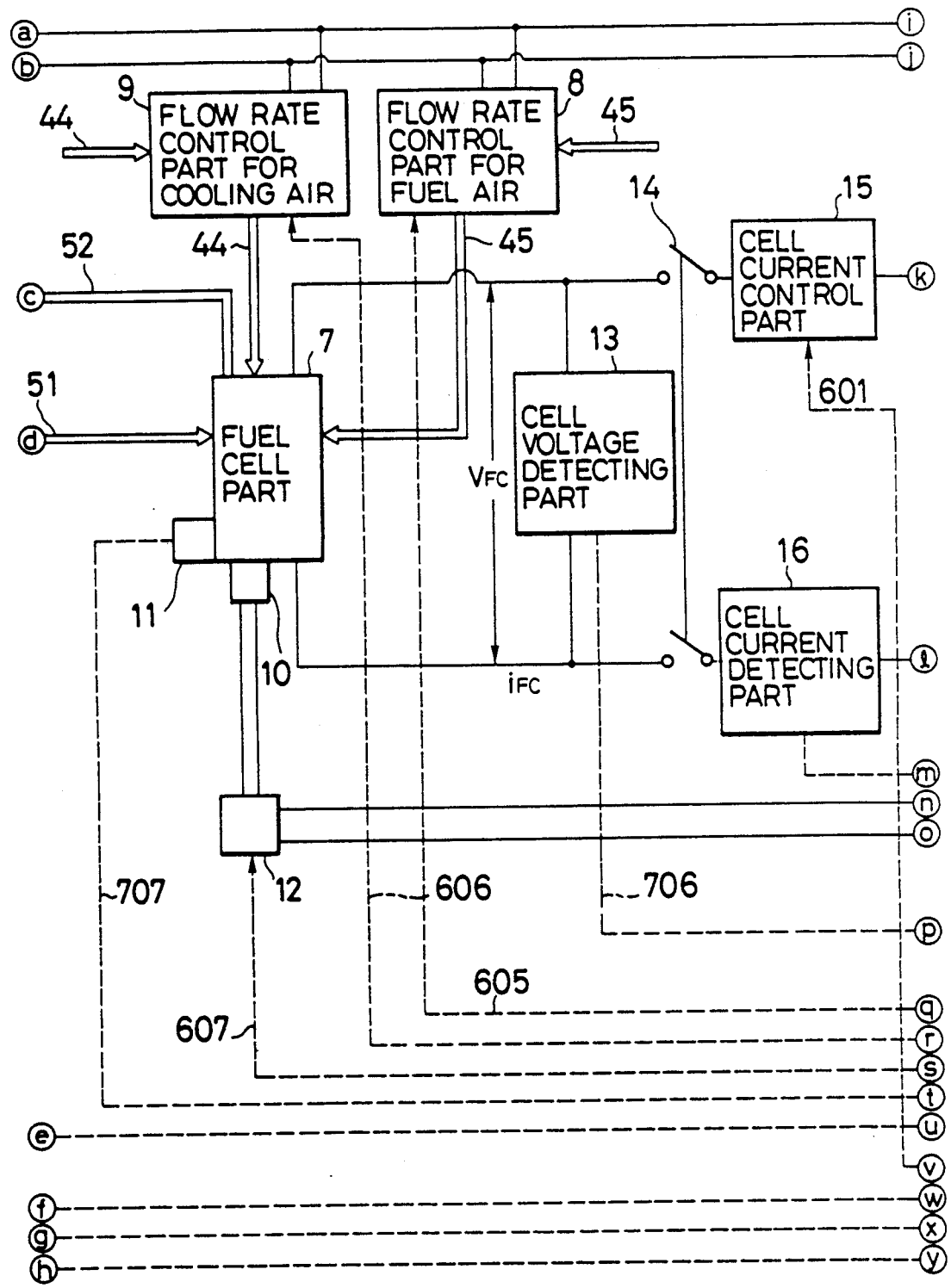
Figure 1C:
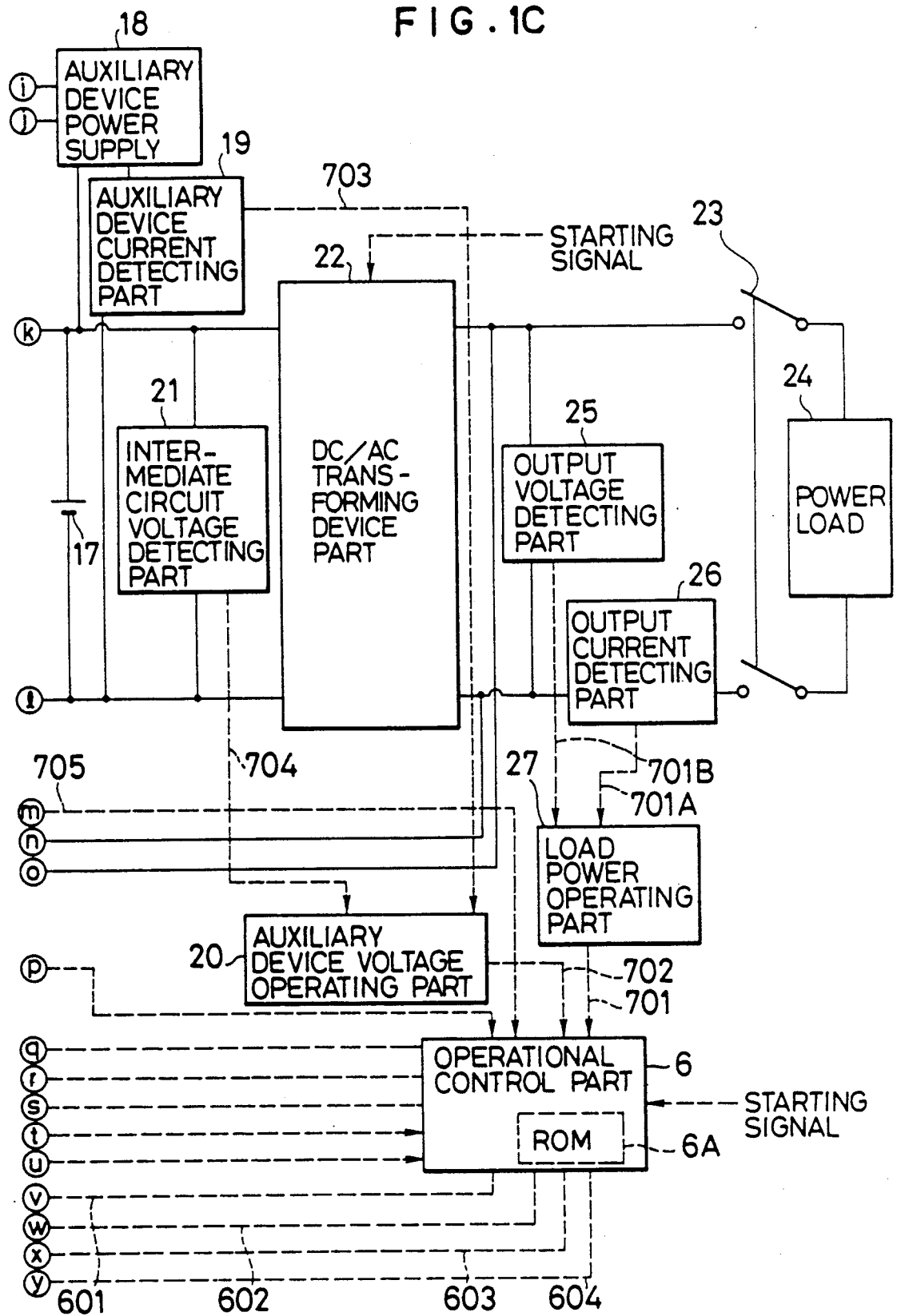

FIGS. 1A, 1B and 1C are block diagrams showing the constructions of the apparatus according to an embodiment of the present invention. In this figure, reference numeral 1 represents a fuel reforming part comprising a reforming unit 1A and a burner 1B of the reforming unit. The reforming unit reforms a liquid material 41 to be reformed such as methanol to generate a fuel gas.

This reforming reaction is performed by passing the material 41 to be reformed through a reforming reaction catalyst filled in a reforming tube (not shown) disposed in the fuel reforming unit 1A.

The control of the flow rate of the material 41 to be reformed is performed by a flow rate control part 2 of the material. It is necessary to heat the reforming unit 1A since the reforming reaction is an endothermic reaction. The heat for heating the unit is obtained by supplying a fuel 42 for reforming unit to the burner 1B of the reforming unit and burning it in auxiliary combustion air 43. The control of the flow rate of the fuel 42 for reforming unit is performed by a fuel flow rate control part 3 for reforming unit. The control of the flow rate of the auxiliary combustion air 43 is carried out by a flow rate control part 4 for auxiliary combustion air. As the fuel, a fuel cell return gas 52 discharged from a fuel cell portion 7 which will be described below may be used.

Figure 2:
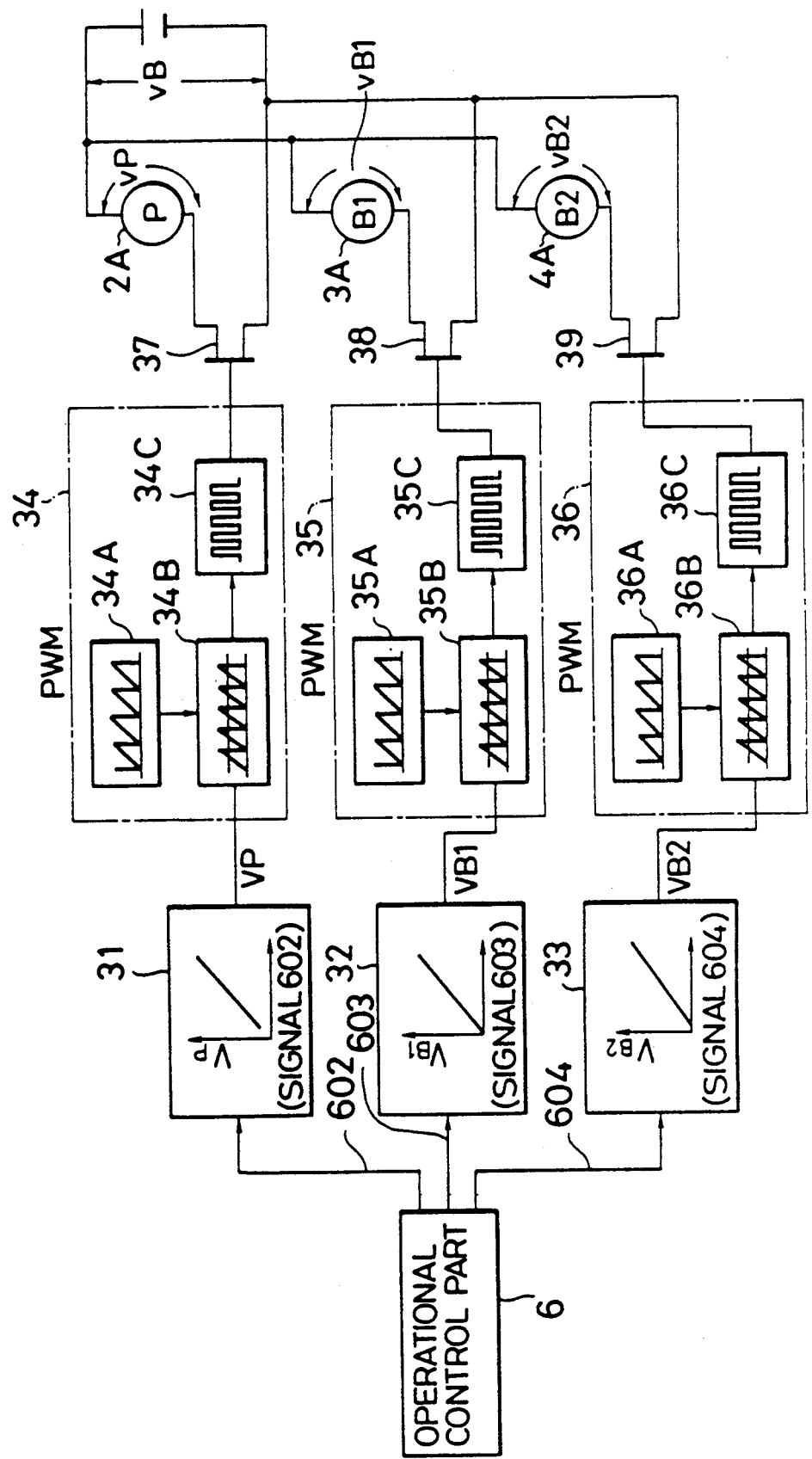
FIG. 2 is a diagram illustrating a part for controlling the flow rate of a material to be reformed, a flow rate control part of a reforming device and a part for controlling the flow rate of auxiliary combustion air in an embodiment according to the present invention.
Figure 3:
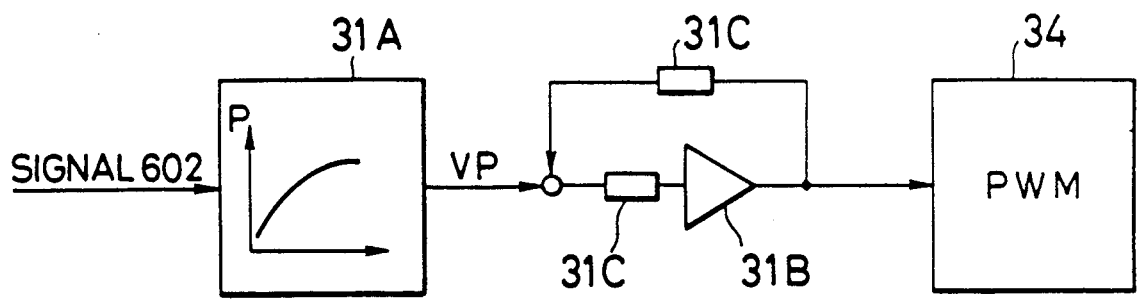
FIG. 3 is a block diagram of operating units which constitute respective control parts shown in FIG. 2.
Figure 4:
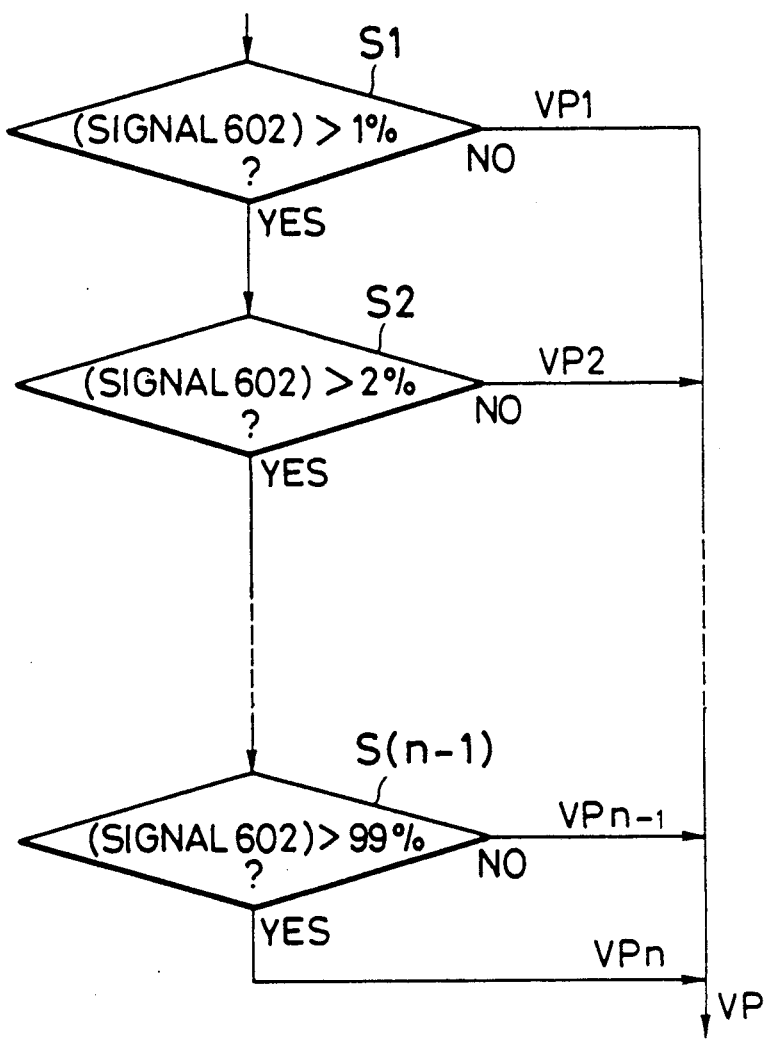
FIG. 4 is a flow chart for illustrating controlling procedures of the operating unit shown in FIG. 3.

FIG. 2 shows the constructions of the aforementioned flow rate control part 2 for material to be reformed, the flow rate control part 3 for reforming unit's fuel and the flow rate control part 4 for auxiliary combustion air. The flow rate control part 2 for material to be reformed, that 3 for reforming unit's fuel and that 4 for auxiliary combustion air each is provided with a pump 2A and blowers 3A and 4A. In FIG. 2, reference numerals 31 to 33 represent operating units which perform operation for controlling the starting material transporting pump 2A, the fuel blower for reforming unit 3A and the auxiliary combustion air blower 4A, respectively. FIG. 3 shows the construction of the operating unit 31 and FIG. 4 shows an example of control procedures of the operating unit 31.

In FIG. 3, reference numeral 31A represents a function generator in the form of a CPU (central processing unit), 31B an operational amplifier and 31C a resistor. The operating unit 31 is designed to obtain Vp of any function by means of the function generator 31A using a value (a signal 602) inputted from an operational control part 6 as a reference.

The control procedures by the operating unit 31 will be explained according to the flow chart shown in FIG. 4. In step S1, the operating unit 31 judges whether the value (the signal 602) inputted from the operational control part 6 is not less than 1% or not and if it is not more than 1%, the unit 31 outputs a voltage signal Vp which is equal to Vp1 to a pulse width modulator 34. If the value (the signal 602) is not less than 1%, the unit proceeds to a step S2 and it judges whether the value (the signal 602) is not less than 2% or not. The operating unit 31 likewise repeats, in order, such judgment operation of the value (the signal 602) till the step S(n−1) and, in each step, the unit inputs a voltage signal Vp corresponding to each judgement to the pulse width modulator.

The procedures of the operating unit for obtaining the voltage signal Vp for operating the starting material transporting pump 2A has been explained above. Procedures for obtaining a voltage signal $V_{B1}$ for operating the reforming unit's fuel blower 3A and that $V_{B2}$ for operating the auxiliary combustion air blower 4A are the same as those explained above in connection with the voltage signal Vp.

In this respect, the values corresponding to signals 602, 603 and 604 are not linearly proportional to the voltages Vp, $V_{B1}$ and $V_{B2}$ and the voltages are functions of signals, i.e., Vp=$f_1$.(signal 602); $V_{B1}$=$f_2$.(signal 603) and $V_{B2}$=$f_3$.(signal 604). Therefore, it is also possible to calculate Vp in a CPU 31A and $V_{B1}$ and $V_{B2}$ in the corresponding CPU's (not shown) each constituting the operating unit 32 or 33.

In FIG. 2, reference numerals 34 to 36 represent pulse width modulators and each comprises an oscillator 34A, 35A or 36A oscillating toothed wave signals, a comparator 34B, 35B or 36B and a pulse generator 34C, 35C or 36C. The comparators 34B, 35B and 36B each outputs a comparative output when the level of the toothed wave signal exceeds that of the voltage signal inputted by each operating unit 31, 32 or 33. The pulse generators 34C, 35C and 36C generator rectangular wave pulses responding to the output from the comparators.

Reference numerals 37 to 39 represent power elements such as bipolar transistors or power MOSFET's for high power and are driven by the output pulse from each pulse generator 34C, 35C or 36C.

The voltage signals Vp, $V_{B1}$ and $V_{B2}$ outputted from the operating units 31, 32 and 33 are inputted to the comparators 34B, 35B and 36B respectively. The width of pulses generated from each pulse generator 34C, 35C or 36C is determined depending on the level of each voltage signal. The pulses outputted from each pulse generator 34C, 35C or 36C are inputted to each power element 37, 38 or 39 as PWM signals. The frequency of the toothed wave signal oscillated from each oscillator 34A, 35A or 36A serves as a frequency for switching each power element 37, 38 or 39.

The pulse generated from the pulse generators 34C, 35C and 36C have a narrow width when the output electric power from the fuel cell portion 7 as will be explained below is small, that is the values corresponding to the signals 602, 603 and 604 are small and hence the time within which the power elements 37 to 39 are in conducting state is very short. Correspondingly, the rotational number of driving motors (not shown) for operating the starting material transporting pump 2A, the reforming unit's fuel blower 3A and the auxiliary combustion air blower 4A becomes small and in turn it is required to supply only a small amount of the starting material and air.

On the contrary, if the output power from the fuel cell portion 7 is large, the width of the pulse generated from the pulse generators 34C, 35C and 36C becomes wide and, therefore, it is required to supply a large amount of the starting material and air in contract with the foregoing case.

Thus, the control of the starting material transporting pump 2A, the reforming unit's fuel blower 3A and the auxiliary combustion air blower 4A is performed by changing the voltage vp, $v_{B1}$ and $v_{B2}$ for driving the motors which drive the pump 2A and the blowers 3A and 4A through switching of the power elements 37 to 39 by PWM signals outputted from the pulse width modulators 34 to 36.

In FIGS. 1A, 1B and 1C, the numeral 5 represents a temperature detector for the reforming unit and detects the temperature of the reforming unit 1A. The temperature detector 5 for the reforming unit used herein is a usually spreading K-type thermocouple according to "JISC 1610 (1981)" which is adapted for fuel cells (available from Tokyo Netsugaku Co., Ltd.). The detected temperature is inputted into the operational control portion 6 as a signal of the reforming unit's temperature.

The operational control portion 6 controls whole the fuel cell power generating apparatus and a program according to the control procedures is memorized in ROM 6A. The operational control portion 6 is started by inputting, thereto, a starting signal generated due to an input from an external switch (not shown).

Reference numeral 7 represents a fuel cell portion in which chemical energy generated through an electrochemical reaction between a fuel gas 51 supplied through a fuel reforming portion 1 and fuel air 45 is converted into electric energy to thus generate DC electric power. The control of the flow rate of the fuel air 45 is performed by a flow rate control part 8 for fuel air which comprises a blower or a pump. The fuel cell portion 7 is maintained at a predetermined temperature by the action of cooling air 44 whose flow rate is controlled by a flow rate control part 9 for cooling air and heat from an AC heater portion 10.

The flow rate control part 9 for cooling air has approximately the same construction as that of the flow rate control part for fuel air 8. The cooling air used is external air. The flow rate control part for fuel air 8 and the part 9 for cooling air are constructed in the same manner as in the control portion shown in FIG. 2.

The AC heater portion 10 is controlled by an AC heater control part 12. Reference numeral 11 represents a temperature detector for fuel cell which may be one identical with that of the temperature detector 5 for reforming unit. The temperature detector 11 for fuel cell detects the temperature of the fuel cell portion 7 and output a cell temperature signal 707 to the operational control portion 6.

The role of the AC heater portion 10 will now be explained. If a power load 24 becomes a low value of the order of not more than its predetermined value $P_R$, the current outputted from the fuel cell portion 7 becomes small and correspondingly the electrode voltage becomes high. If the electrode voltage exceeds a predetermined level, corrosion of electrode catalyst, in other word deterioration of the electrode is caused. For this reason, it is necessary to consume electric power for preventing an increase in the electrode voltage. Moreover, the quantity of heat generated is decreased by restricting the current of the fuel cell portion 7 to not more than a predetermined level, following the electric power load 24 and, as a result, the cell is cooled. Therefore, it is necessary to increase the temperature of the cell by heating it. These two conditions can be satisfied by supplying a power to the AC heater portion 10.

The AC heater control part 12 may be in the same form as that of the flow rate control part 2 or those in which a plurality of heaters are switched on or off. In this case, the latter is employed. FIG. 5 shows the constructions of the AC heater control part 12 and the AC heater part 10. In the figure, SSR1 to SSR4 are solid state relay and in this embodiment SF10D-H1 (available from Fuji Electric Co., Ltd.) is utilized. Reference numerals 41, 43, 45 and 47 represent heaters having consumed power of 75, 150, 300 and 600 W respectively.

Since the ratio of these heaters is established at 1:2:4:8, the AC heater part 10 can be controlled to a power ranging from 75 to 1125 W by switching on or off these heaters.

In FIGS. 1A, 1B and 1C, the reference numeral 13 represents a cell voltage detecting part which detects the cell voltage $V_{FC}$ outputted from the fuel cell part 7 and outputs a cell voltage signal 706 to the operational control part 6. The reference numeral 14 represents a DC switch which is opened or closed manually or by any means according to need.

Figure 6A:
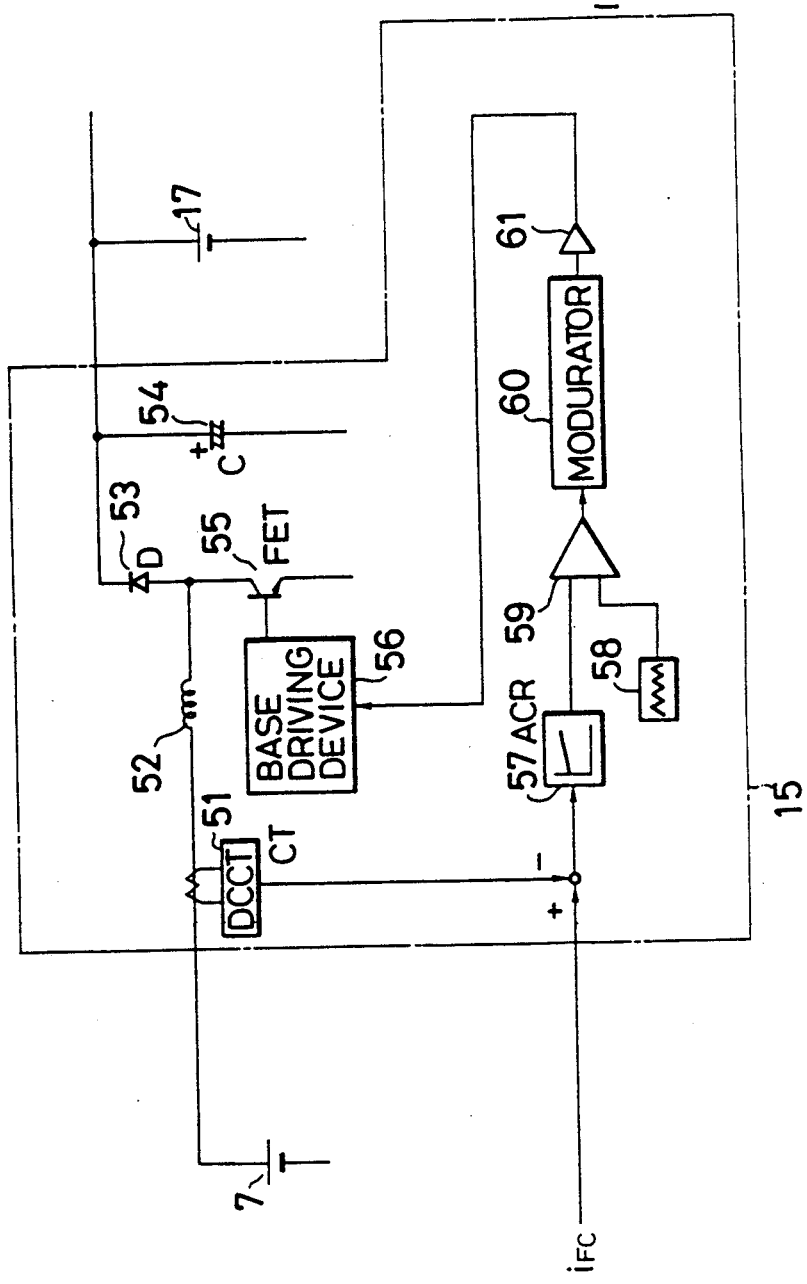
FIGS. 6A and B are diagrams for illustrating a step-up chopper.
Figure 6B:
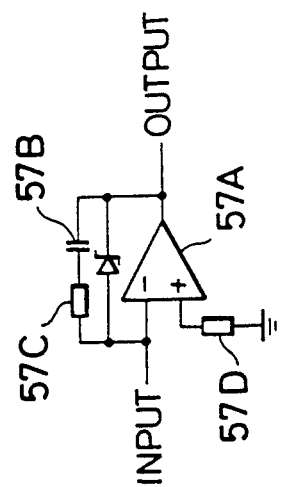
FIG. 6B is a diagram showing an automatic current regulator used in the step-up chopper of FIG. 6A.

Reference numeral 15 represents a cell current control part which is usually a chopper. As the fuel cell voltage is low in this case, a step-up chopper (available from Fuji Electric Co., Ltd.) as shown in FIG. 6A and 6B is herein used. The step-up chopper comprises, as shown in FIG. 6, a Hall CT 51 (current transformer) for detecting DC current, a reactor 52, a diode 53, a condenser 54, an FET 55, a base driving unit 56, an ACR (automatic current regulator) 57, a toothed wave oscillator 58, a comparator 59, a modulator 60 and a buffer 61. It is also possible to use a transistor instead of the FET 55. The ACR 57 comprises, as shown in FIG. 6, an operational amplifier 57A, a condenser 57B and resistors 57C and 57D.

The cell current control part 15 controls the cell current $I_{FC}$ outputted from the fuel cell part 7 on the basis of the first signal 601 from the operational control part 6. The first signal 601 can be obtained by processing a load power signal 701, an auxiliary device power signal 702 and a cell voltage signal 706 inputted to the operational control part 6.

Reference numeral 16 represents a cell current detecting part in the form of a Hall CT which is NNC-04BHM 400A/8V (available from Nana Electronics Co., Ltd.). The cell current detecting part 16 detects the cell current $I_{FC}$ and outputs a cell current signal 705 corresponding to the detected result to the operational control part 6.

Reference numeral 17 represents a secondary battery which backs up the DC current outputted from the fuel cell part 7. The secondary battery 17 is charged by the output current from the fuel cell part 7.

Reference numeral 18 represents a power supply part for an auxiliary device which thus supplies an electric power to an auxiliary devices such as the reforming material flow rate control part 2, the reforming unit fuel flow rate control part 3, the auxiliary combustion air flow rate control part 4, the fuel air flow rate control part 8 and the cooling air flow rate control part 9.

Reference numeral 19 represents an auxiliary device current detecting part in the form of a Hall CT which is herein NNC-01BH2 100A/8V (available from Nana Electronics Co., Ltd.). The auxiliary device current detecting part 19 selectively detects a current which passes through the power supply 18 for auxiliary devices among the cell current $I_{FC}$ and outputs an auxiliary device current signal 703 corresponding to the detected value to an auxiliary device power operating part 20 in the form of an AC transducer.

As such auxiliary device power operating part 20, for instance, a WTT2-83A-12 (available from Dai-Ichi Keiki K. K.) may be used when the specified power from an orthogonal transformation device 22 is a single-phase alternating current or a WTT2-83A-33 (available from the same company) may be used when the specified power from a DC/AC converter 22 is a three phase alternating current.

Reference numeral 21 represents an intermediate circuit voltage detecting part which detects the voltage between both ends of the secondary battery 17 and outputs an intermediate circuit voltage signal 704 corresponding to the detected value to the auxiliary device power operating part 20. The auxiliary device power operating part 20 calculates the product of the auxiliary current signal 703 and the intermediate circuit voltage signal 704 and outputs the absolute value of the product, i.e., the auxiliary device power signal 702 to the operational control part 6.

Reference numeral 22 represents an DC/AC transforming device part which converts the DC power outputted from the fuel cell part 7 and the secondary battery 17 into an AC power. The DC/AC transforming device 22 is started by inputting, thereto, a starting signal generated by, for instance, an input through an external switch (not shown).

Reference numeral 23 represents an AC switch which can be opened or closed, for instance, manually. The AC power which is converted in the DC/AC transforming device 22 by shifting the switch to the closed state is supplied to an electric power load 24.

Reference numeral 25 represents an output voltage detecting part which detects the voltage between both ends of the power load 24 measured by a resistance partial potential and outputs an output voltage signal 701B corresponding to the detected value to a load power operating part 27.

Reference numeral 26 represents an output current detecting part in the form of a usual CT or a shunt which is herein FRC-5 (available from Fuji Electric Co., Ltd.) according to "JISC 1731". The output current detecting part 26 detects the output current passing through the power load 24 and outputs an output current signal 701A corresponding to the detected value to the load power operating part 27.

As the load power operating part 27, there may be used those identical to the auxiliary device power operating part 20. The load power operating part 27 calculates the product of the output voltage signal 701B and the output current signal 701A and outputs the absolute value of the product, i.e., the load power signal 701 to the operational control part 6.

Control signals for fuel cell power generating apparatus, i.e., the first signal 601 to the seventh signal 607 are obtained through the processing of detected signals inputted in the operational control part 6. The first signal 601 has already been explained above. The second signal 602 to the fourth signal 604 can be obtained by processing the reforming unit temperature signal 708 and the cell current signal 705 in the operational control part 6. In addition, the fifth and sixth signals 605 and 606 can be obtained by processing the cell temperature signal 707 and the cell current signal 705 and the seventh signal 607 by processing the load power signal 701.

The foregoing control of the fuel cell power generating apparatus, that is the processing in the operational control part 6 can be performed according to the following three methods as will be explained below.

Control Method 1

Figure 7:
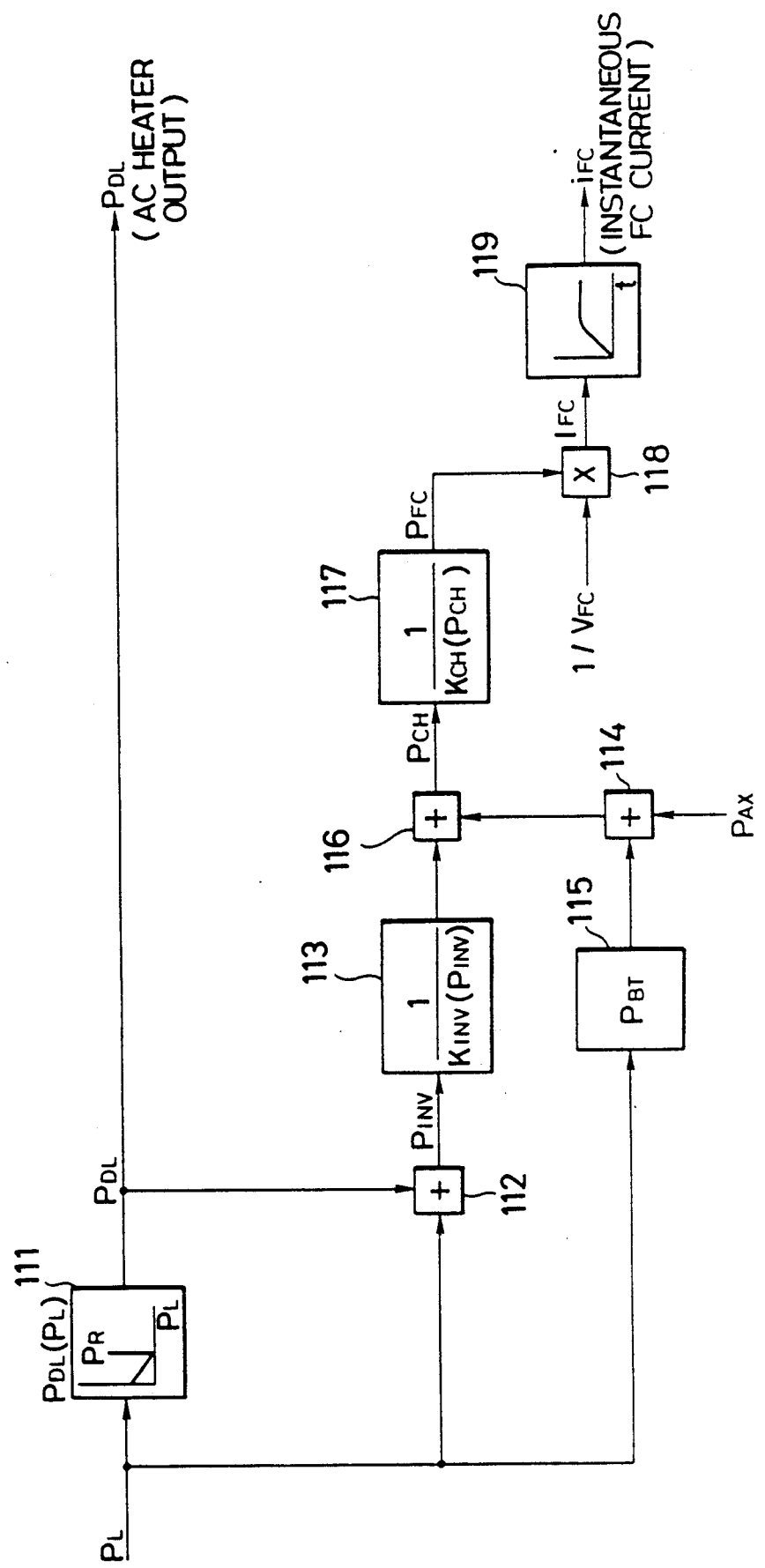
FIG. 7 is a block diagram showing procedures of an operational control in the embodiment of the present invention.

FIG. 7 shows the flow of a signal observed when the load power signal 701 is inputted in the operational control part 6 and processed therein. In step 111, the processing of a signal by a linear function element having a negative slope, i.e., the processing of a load power signal $P_L$ by the linear function represented by the following formula (2) is performed. In the formula (2), $P_R$ is a predetermined value of the fuel cell output power and will be explained in more detail below:

$$P_{DL}(P_L) = P_R - P_L \tag{2}$$

As seen from the formula (2), the AC heater output power $P_{DL}$ is calculated by multiplying the load power $P_L$ by $-1$ and adding it to value $P_R$. The value of $P_{DL}$ is inputted into the AC heater control part 12 only when the calculated value is positive. If the calculated value is negative, $P_{DL}$ is set at zero. Thus, the AC heater output $P_{DL}$ can be determined.

In step 112, the load power $P_L$ is added to the AC heater output $P_{DL}$ and, in step 113, this summed-up value is multiplied by the reciprocal of the conversion efficiency, $1/K_{INV}(P_{INV})$, of the DC/AC transforming device part 22.

In step 115, a charging power $P_{BT}$ required for the secondary battery 17 is calculated. The charging power $P_{BT}$ calculated in step 115 is added to an auxiliary device power $P_{AX}$ in step 114. In step 114, the summed-up value in step 113 is added to a value summed in step 116 to calculate an output $P_{CH}$ of the cell current control part.

In step 117, the $P_{CH}$ is divided by the reciprocal of the power efficiency, $1/(K_{CH}(P_{CH}))$, of the cell current control part 15. In step 119, if the power load varies, a time lag element f(t) for preventing the abrupt change in the fuel cell current caused corresponding to the variation of the power load is added.

Then, as an example of control operation in the embodiment of the present invention, a case where the fuel reforming part 1 and the fuel cell part 7 are in steady operation and the consumed power Po of the power load 24 is shifted to $P_1$ will be explained below with reference to FIGS. 1A, 1B, 1C and 7.

When the consumed power Po of the power load 24 is shifted to $P_1$, the load power operating part 27 outputs a load power signal 701 which is a power signal corresponding to the value $P_1$ to the operational control part 6.

As the fuel reforming part 1 and the fuel cell part 7 are in steady operation, there is power consumption by, for instance, a pump or blower in each of the auxiliary devices such as the flow rate control part 2 for material to be reformed, the flow rate control part 3 for starting material to be reformed, the flow rate control part 4 for auxiliary combustion air, the flow rate control part 8 for fuel air and the flow rate control part 9 for cooling air. If this total power consumption is equal to $P_{AX}$, the auxiliary device power operating part 20 outputs an auxiliary device power signal 702 which corresponds to $P_{AX}$ to the operational control part 6.

(1) Cases Where Po<$P_R$<$P_1$ $P_R$ is a predetermined value. The predetermined value $P_R$ is determined by the amount of heat required for the fuel cell and is previously established. For instance, it is 40% of the maximum power of the fuel cell for a small fuel cell and 20 to 30% thereof for a large fuel cell.

If the load power $P_L$ equals to Po, $P_{DL}$ in the formula (2) is a positive value. Therefore, a power ($P_R$−Po) is inputted into the AC heater control part 12. In addition, the load power Po is added to the foregoing $P_{DL}$ in step 112 and the resulting summed value, i.e., the output $P_{INV}$ of the DC/AC transforming device is calculated. In this case, $P_{INV}$ equals to $P_R$. Thus, if $P_R$ is multiplied by the reciprocal $1/(K_{INV}(P_{INV}))$ of the efficiency of the orthogonal transforming device in step 113 and the product is added to the foregoing auxiliary device power $P_{AX}$ in step 116, the power $P_{CH}$ to be outputted from the cell current control part 15 to the intermediate circuit voltage detecting part 21 is expressed by the following formula (3):

$$P_{CH} = P_R/(K_{INV}(P_R)) + P_{AX} \tag{3}$$

When the value $P_{CH}$ is multiplied by the reciprocal $1/(K_{CH}(P_{CH}))$ of the power efficiency of the cell current control part 15, the fuel cell output power $P_{FC}$ represented by the following formula (4) can be obtained. In addition, the fuel cell current $I_{FC}$ is represented by the formula (5):

$$P_{FC} = \{1/K_{CH}(P_{CH})\} \cdot \{(P_R/K_{INV}(P_R)) + P_{AX}\} \tag{4}$$

$$I_{FC} = P_{FC}/V_{FC} \tag{5}$$

$V_{FC}$: Fuel Cell Voltage

Since the apparatus is in steady operation, the current command signal $i_{FC}$ which is to be inputted to the cell current control part 15 is equal to $I_{FC}$ in the formula (5).

When the load power $P_L$ is shifted from Po to $P_1$, the fuel cell output $P'_{FC}$ and the fuel cell current $I'_{FC}$ are likewise represented by the following formulas (6) and (7) respectively.

$$P'_{FC} = \{1/K_{CH}(P'_{CH})\} \cdot \{(P_R/K_{INV}(P_R)) + P_{AX}\} \tag{6}$$

$$I_{FC} = P_{FC}/V_{FC} \tag{7}$$

At this time, the cell current command signal $i'_{FC}$ is given by the following equation (8) which is derived by multiplying the time lag element f(t) of the reforming unit 1A by the formula (7):

$$i'_{FC} = I'_{FC} f(t) \tag{8}$$

The element f(t) is a value determined depending on properties of the reforming unit 1A. The fuel cell current outputted from the fuel cell part 7 which is required for outputting the load power $P_1$ is given by $I'_{FC}$ as seen from the formula (7).

When the load power is abruptly shifted from Po to $P_1$, in other words, the output current is rapidly shifted from $I_{FC}$ to $I'_{FC}$, the amount of $H_2$ in the fuel cell return gas 52 is rapidly changed. Since Po<$P_1$, the content of $H_2$ in the return gas 52 is rapidly reduced. As the fuel cell return gas 52 is introduced into the reforming unit burner 1B as a fuel to heat the reforming unit 1A, such abrupt reduction of the return gas 52 in turn causes temperature drop of the reforming catalyst in the reforming unit 1A.

For this reason, the reforming of the starting material 41 to be reformed becomes insufficient. Thus, the follow-up of the fuel cell output current for the variation of the power load 24 is slowly performed by multiplying a time lag element f(t) by the formula (7) so that the reforming unit 1A can follow up.

When the time lag element f(t) is multiplied, the fuel cell current gradually increases as shown in FIG. 8B even when the load power is shifted from Po to $P_1$ (FIG. 8A). Thus, the power is outputted from the secondary battery 17 for compensating the insufficient power of the fuel cell part 7 during the period ranging from time $t_1$ to $t_2$.

The shadowed area in FIG. 8C corresponds to the discharge areas of the secondary battery. When the variation in the load is repeated in the fuel cell power generating apparatus, the secondary battery 17 reaches the complete discharge state and thus it is necessary to calculate the charging power $P_{BT}$ and to add the same in step 115 shown in FIG. 7. In this connection, the charging power $P_{BT}$ is a function of the intermediate circuit voltage detected by the intermediate circuit voltage detecting part 21. Therefore, the equation (6) can be rewritten as follows by taking into consideration the charging power $P_{BT}$:

$$P'_{FC} = \{1/K_{CH}(P'_{CH})\} \cdot \{(P_1/K_{INV}(P_1)) + P_{AX} + P_{BT}(V_B)\} \tag{9}$$

$$(P'_{CH}) = (P_1/K_{INV}(P_1)) + P_{AX} + P_{BT})$$

The fuel cell part 7 also outputs a power to be supplied to the secondary battery 17 and thus it is possible to prevent the secondary battery 17 from reaching the complete discharge state.

(2) Cases Where Po<$P_1 \leq P_R$

In this case, the consumed power of the load power $P_L$ is not more than $P_R$ before and after the load power $P_L$ varies and thus the results obtained by the operation in step 112 become $P_R$ in both cases. Therefore, the fuel cell output power $P_{FC}$ and the fuel cell output current $I_{FC}$ are represented by the formulas (4) and (5) respectively.

The seventh signal 607 corresponding to $P_{DL}(P_L)$ given by the conditions in the formula (1) is outputted from the operational control part 6. The seventh signal 607 is inputted in the AC heater control part 12. The AC heater part 10 which is controlled by the AC heater control part 12 heats the fuel cell part 7 with an output power $P_{DL}(P_L)$.

The fuel cell part 7 is designed so that it can prevent overheat due to such heating. The temperature of the fuel cell part 7 is detected by a fuel cell temperature detector 11 and the same control as that encountered in the case where Po<$P_R$<$P_1$ is subsequently performed.

Thus, the apparatus is controlled by supplying the output power from the fuel cell part 7 to the AC heater part 10 so that the output power from the orthogonal transforming device 22 is approximately equal to the predetermined value $P_R$. In other words, when the load power $P_L$ is not more than the predetermined value $P_R$, the fuel cell output becomes always constant even if the load power $P_L$ varies. At this stage, the current outputted from the fuel cell part 7 is approximately constant.

(3) Cases Where Po>$P_R$ and $P_1$>$P_R$

When Po and $P_1$ are larger than the predetermined value $P_R$ (irrespective of the relation between Po and $P_1$), the summed value in step 112 is Po and $P_1$ and then a control signal for leading out the fuel cell output current following the power load 24 from the fuel cell part 7 can be obtained according to the same processing as explained above.

When the consumed power of the power load 24 is shifted from Po to $P_1$, the load power operating part 27 outputs a load power signal 701 which is a power signal corresponding to the value $P_1$ to the operational control part 6. Since the output power inputted to the AC heater part 10 is zero, the power $P_{in}$ to be inputted to the DC/AC transforming device 22 is given by the following formula (10):

$$P_{in} = P_1 \cdot 1/K_{INV} \tag{10}$$

In the foregoing cases (1) to (3), the cell current command signal $i'_{FC}$ corresponding to the instantaneous value of the fuel cell current $I'_{FC}$ is the first signal 601. When the value $i'_{FC}$ is inputted in the cell current control part 15, the value of current outputted from the fuel cell 7 becomes $I''_{FC}$ (effective current). The cell current detecting part 16 detects the value of $I'_{FC}$ and outputs a cell current signal 705 corresponding to $I''_{FC}$ to the operational control part 6.

In order to generate the fuel gas 51 in the fuel reforming unit 1A in an amount required for leading out a current $I''_{FC}$ from the fuel cell part 7, the second signal 602 which is a reformed material flow rate signal corresponding to this current $I''_{FC}$ is outputted from the operational control part 6. The second signal 602 can be obtained by processing the reforming unit temperature signal 708 and the cell current signal 705 in the operational control part 6.

When the second signal 602 is inputted to the flow rate control part 2 for the material to be reformed, the flow rate of the material 41 to be reformed is controlled so as to generate a current corresponding to $I''_{FC}$. At this stage, the operational control part 6 also outputs the fifth signal 605 which is the combustion air flow rate signal corresponding to the current $I''_{FC}$.

When the fifth signal 605 is inputted in the flow rate control part 8 for fuel air, the flow rate of the fuel air 45 is controlled so as to generate a current $I''_{FC}$.

As mentioned above, the flow rate of the material 41 to be reformed and the temperature of the reforming unit 1A correspondingly varies. The degree of change in the reforming unit temperature is detected by the reforming unit temperature detector 5 and the latter outputs the detected value as a reforming unit temperature signal 708 to the operational control part 6.

The reforming unit temperature signal 708 is processed simultaneously with the cell current signal 705 in the operational control part 6 and the part 6 outputs the fourth and third signals 604 and 603 which are flow rate control signals to perform the flow rate control of the auxiliary combustion air 43 and the fuel 42 for reforming unit.

The third and fourth signals 603 and 604 are inputted in the flow rate control part 3 for fuel for reforming unit and the flow rate control part 4 for auxiliary combustion air respectively in which the flow rate of the fuel 42 for reforming unit and that of the auxiliary combustion air 43 are controlled in order to maintain the temperature of the fuel reforming unit 1A at a predetermined value. The flow rates of the fuel gas 51 and the fuel air 45 vary in proportion to the change in the flow rates of the fuel 42 for the reforming unit and the auxiliary air 43 and accordingly the temperature of the fuel cell part 7 also varies.

The degree of the temperature change in the fuel cell part 7 is detected by the fuel cell temperature detector 11 and a fuel cell temperature signal 707 corresponding to the detected value is inputted in the operational control part 6.

The operational control part 6 outputs the sixth signal 606 which is a control signal for controlling the flow rate of the cooling air 44 required for maintaining the temperature of the fuel cell part 7 at a predetermined value. The sixth signal 606 is inputted in the flow rate control part 9 for the cooling air to control the flow rate of the cooling air 44 to thus maintain the temperature of the fuel cell part 7 at a predetermined value.

In the following control methods 2 and 3, the fuel cell power generating apparatus likewise operates as has been explained above.

CONTROL METHOD 2

Figure 9:
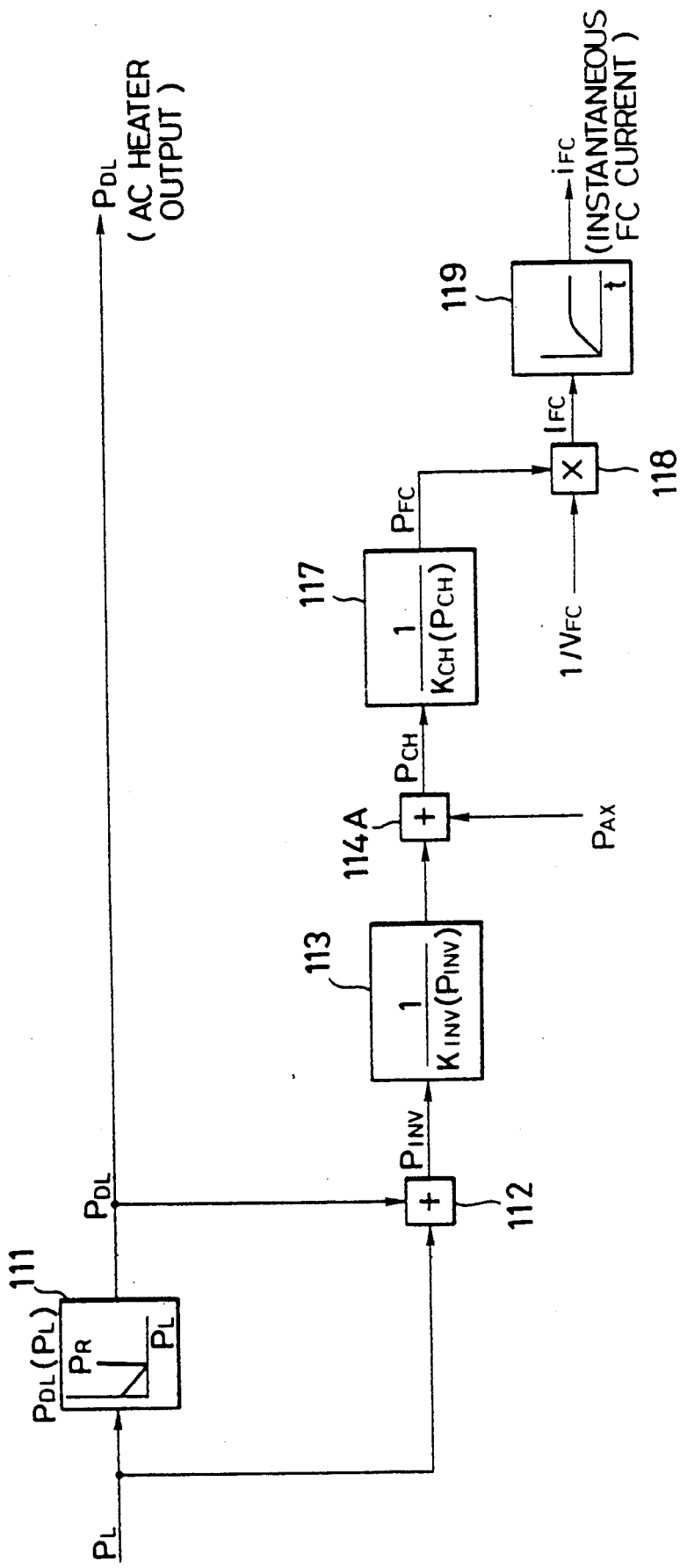
FIGS. 9 and 10 are block diagrams showing procedures of an operational control in the embodiment of the present invention.

FIG. 9 shows the flow of a signal observed when a load power signal 701 is inputted in the operational control part 6 and processed therein. First of all, the same operations as in the control method 1 are performed in steps 111 to 113.

A value calculated in step 113 is added to an auxiliary device power $P_{AX}$ in step 114A and thus an output $P_{CH}$ for the cell current control part is calculated. In step 117, the value $P_{CH}$ is divided by the reciprocal of the output efficiency of the cell current control part 15. If the power load varies, the fuel cell current correspondingly causes abrupt change. Therefore, a time lag element is added in step 119 for preventing such an abrupt change in the fuel cell current.

Then, an example of the control operation according to the present invention will be explained below with reference to FIGS. 1 and 9. First, a case where the fuel reforming part 1 and the fuel cell part 7 are in the steady operation and the consumed power of the power load 24 is shifted from Po to $P_1$ will be explained.

(1) Cases Where $Po < P_R < P_1$

If the load power $P_L$ equals to Po, the value $P_{DL}$ in the formula (2) is a positive. Therefore, an electric power ($P_R - Po$) is inputted in the AC heater control part 12. In step 112, the load power Po is added to the foregoing $P_{DL}$ and the summed value, i.e., an output $P_{INV}$ of the DC/AC transforming device is calculated. In this case, $P_{INV} = P_R$ is satisfied.

Therefore, when the reciprocal $1/K_{INV}(P_{INV})$ of the efficiency of the orthogonal transforming device is multiplied by $P_R$ in step 113 and the product is added to the foregoing auxiliary device power $P_{AX}$ in step 114, the power $P_{CH}$ to be outputted from the cell current control part 15 is given by the formula (3) in the control method 1. Subsequently, the same operations as in the control method 1 are performed to likewise control the fuel cell power generating apparatus in steps 117, 118 and 119. Moreover, when $Po > P_1$, the same control as explained above is performed.

(2) Cases Wherein $Po < P_1 \leq P_R$

The same as the control method 1.

(3) Cases Wherein $Po < P_R$ and $P_1 > P_R$

The same as the control method 1.

CONTROL METHOD 3

Figure 10:
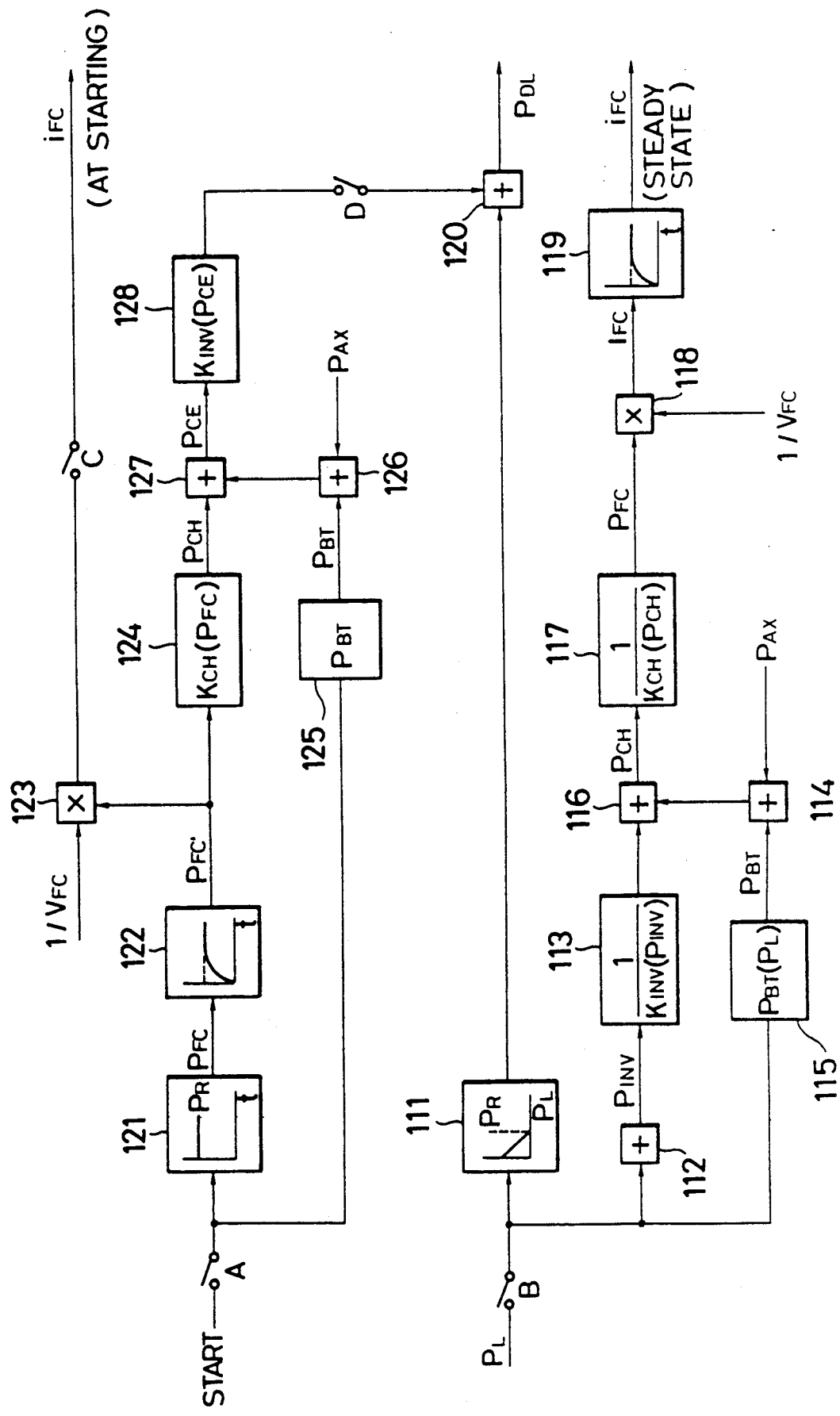

FIG. 10 shows the flow of a signal observed when the load power signal 701 is inputted in the operational control part 6 and processed therein. A switch A and switches B to D shown in FIG. 10 perform on-off operations synchronously with a DC switch 14 and an AC switch 23.

The switch A is in the on-state when the switch 14 is in the on-state. The switch B is in the on-state when the AC switch 23 is in the on-state while the switches C and D are in the off-state when the AC switch 23 is in the on-state. In this respect, the DC switch 14 is in the on-state and the AC switch 23 is in the off-state at the starting, while both DC and AC switches 14 and 23 are in the on-state during steady operation.

Steps 111 to 120 show the flow of a signal observed when the fuel cell generating system is in steady operation. The processings in steps 111 to 119 are the same as those in the control method 1.

Steps 120 to 128 show the flow of a signal in the operational control part 6 observed when the fuel cell generating system is started.

Figure 11A:
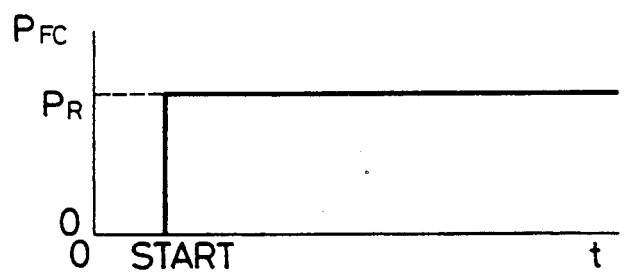
FIGS. 11A, 11B and 11C an diagrams showing the variation, with time, of the control method shown in FIG. 10.

At an instance when the fuel cell generating system is started and the switch A is switched on, a predetermined value $P_R$ as shown in FIG. 11(A) is outputted as a fuel cell output $P_{FC}$ in step 121. At this time, the temperature of the fuel cell part 7 is still low. Therefore, a time lag element is added to the fuel cell output power $P_{FC}$ in step 122 and thus the fuel cell output power $P'_{FC}$ including the time lag element is outputted.

The $P'_{FC}$ is divided into two portions, one of which is multiplied by $1/V_{FC}$ in step 123 and a fuel cell current value to be outputted from the fuel cell part 7 is calculated.

The other portion thereof is operated in steps 124 to 128 with respect to whether there is any surplus power $P_L$ to be outputted to the AC heater control part 12 or not. More specifically, a power $P_{CM}$ outputted from the cell current control part 15 is calculated in step 124. A charging power $P_{BT}$ of the secondary battery computed in step 125 is added to the auxiliary device power $P_{AX}$ in step 126. The summed up power is subtracted from the power $P_{CE}$ in step 127 to output a power $P_{CE}$. The power $P_{CE}$ is multiplied by an efficiency of the DC/AC transforming device in step 128 and thus the $P_L$ to be outputted to the AC heater control part 12 is calculated.

First, When the fuel cell generating system is in the steady operation, the same processing as in the control method 1 is performed in either of the following three cases (1) to (3). In this time, it is assumed that the DC switch 14 and the AC switch 23 are in the on-state and that the temperature of the fuel cell part 7 is raised to a sufficient level.

(1) Cases Where $P_O < P_R < P_1$
(2) Cases Where $P_O < P_1 \leq P_R$
(3) Cases Where $P_O > P_R$ and $P_1 > P_R$ On the other hand, at the starting of the fuel cell generating system, the power load 24 is not connected to the generating system and thus the AC switch 23 is in the off-state. If the same control as that performed during steady operation is performed upon starting the system, the following problems arise.

The instantaneous fuel cell current $i_{FC}$ is expressed by the formula (5) which is multiplied by a time lag element f(t) and the value $i_{FC}$ gradually increases from 0 to $I_{FC}$. However, the AC heater output power $P_{DL}$ is given by the following formula:

$$P_{DL} = P_R \quad (11)$$

and the secondary battery 17 continues to discharge for a time, ranging from several minutes to several tens of minutes, elapsed till the temperature of the fuel cell part 7 is sufficiently raised. In other words, the power $P_{DL}$ shows the same rising as that observed in steady operation as shown in FIG. 11(C). This results in an increase in the capacity of the secondary battery 17 and is not favorable for a small-sized fuel cell generating apparatus.

Figure 11B:
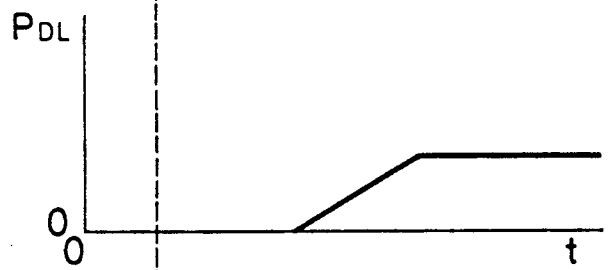
Figure 11C:
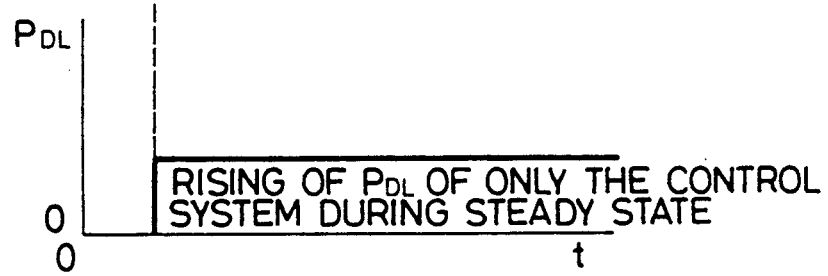

Therefore, it is necessary, at the starting, to control the apparatus so that the power $P_{DL}$ gradually increases as shown in FIG. 11(B). More specifically, it is necessary to perform a control as in the steps 121 to 128 shown in FIG. 10.

At the starting, the fuel cell output power $P_{FC}$ and the instantaneous fuel cell current $i'_{FC}$ are given by the formulas (12) and (13):

$$P_{FC} = g(t) \cdot P_R \quad (12)$$

$$i'_{FC} = P_{FC}/V_{FC} \quad (13)$$

If the formula (12), g(t) is a time lag element of the reforming unit 1A at the starting.

At this stage, the AC heater output power $P_{DL}$ is given by the following formula (14):

$$P_{DL} = \{g(t) \cdot P_R \cdot K_{CH}(P_{FC}) - P_{BT} - P_{AX}\} \cdot K_{INV}(P_{CE}) \quad (14)$$

$$(P_{FC} = g(t) \cdot P_R \cdot P_{CE} = g(t) \cdot P_R \cdot K_{CH}(P_{FC}) - P_{BT} - P_{AX})$$

Wherein $K_{CH}$ is an efficiency of the cell current control part with respect to the input and $K_{INV}$ is an efficiency of the DC/AC transforming device for the input.

The discharge from the secondary battery 17 can be reduced by performing the control at the starting as explained above. Only a positive value is used for the power $P_{DL}$ and, therefore, it shows a rising as shown in FIG. 11(C). In FIG. 11(C), the power $P_{DL}$ is expressed as a linear rising having a slope, but it is sometimes expressed as a curve due to the relation with, for instance, the auxiliary device power $P_{AX}$.

Figure 12A:
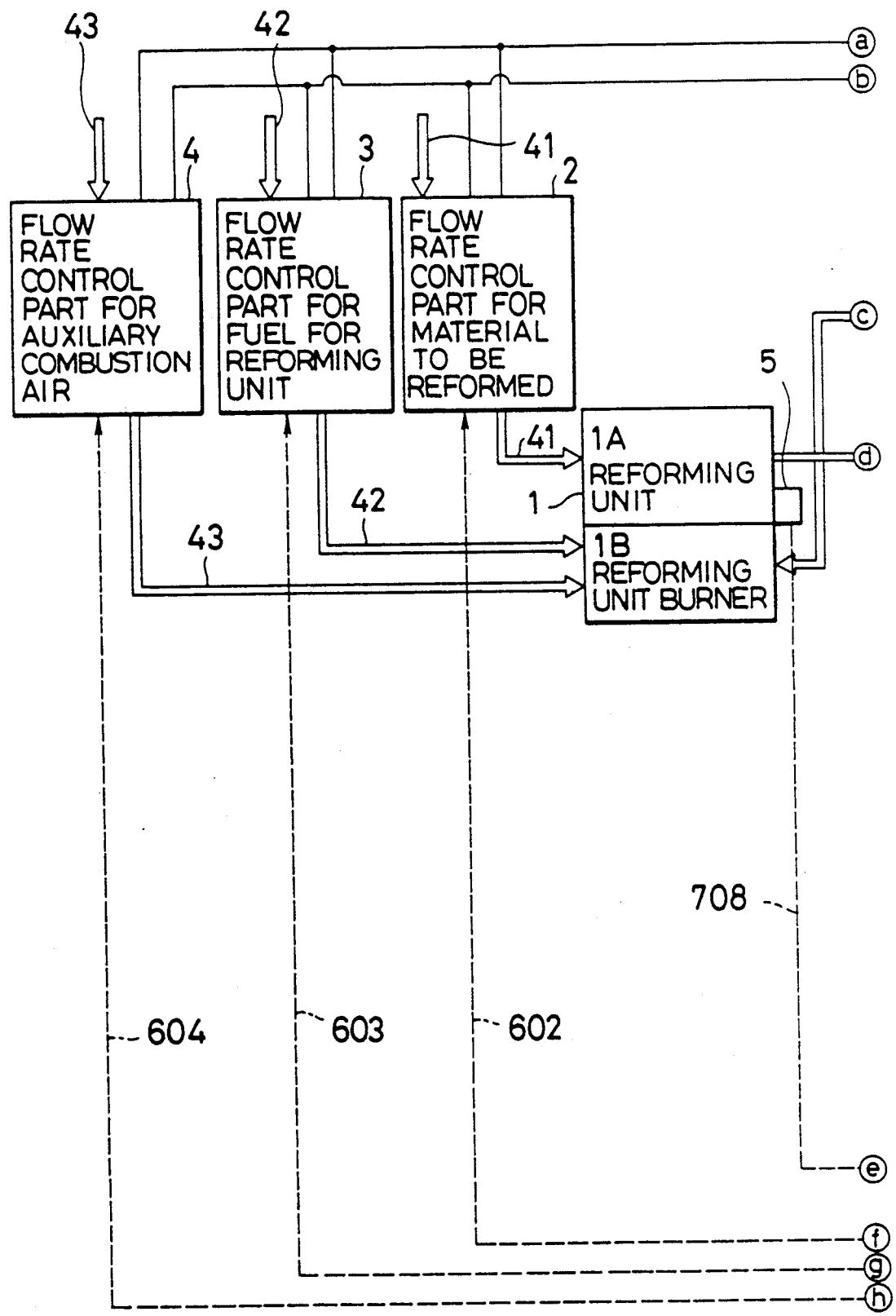
FIGS. 12A, 12B and 12C are block diagrams for illustrating another embodiment of the fuel cell power generating apparatus according to the present invention.
Figure 12B:
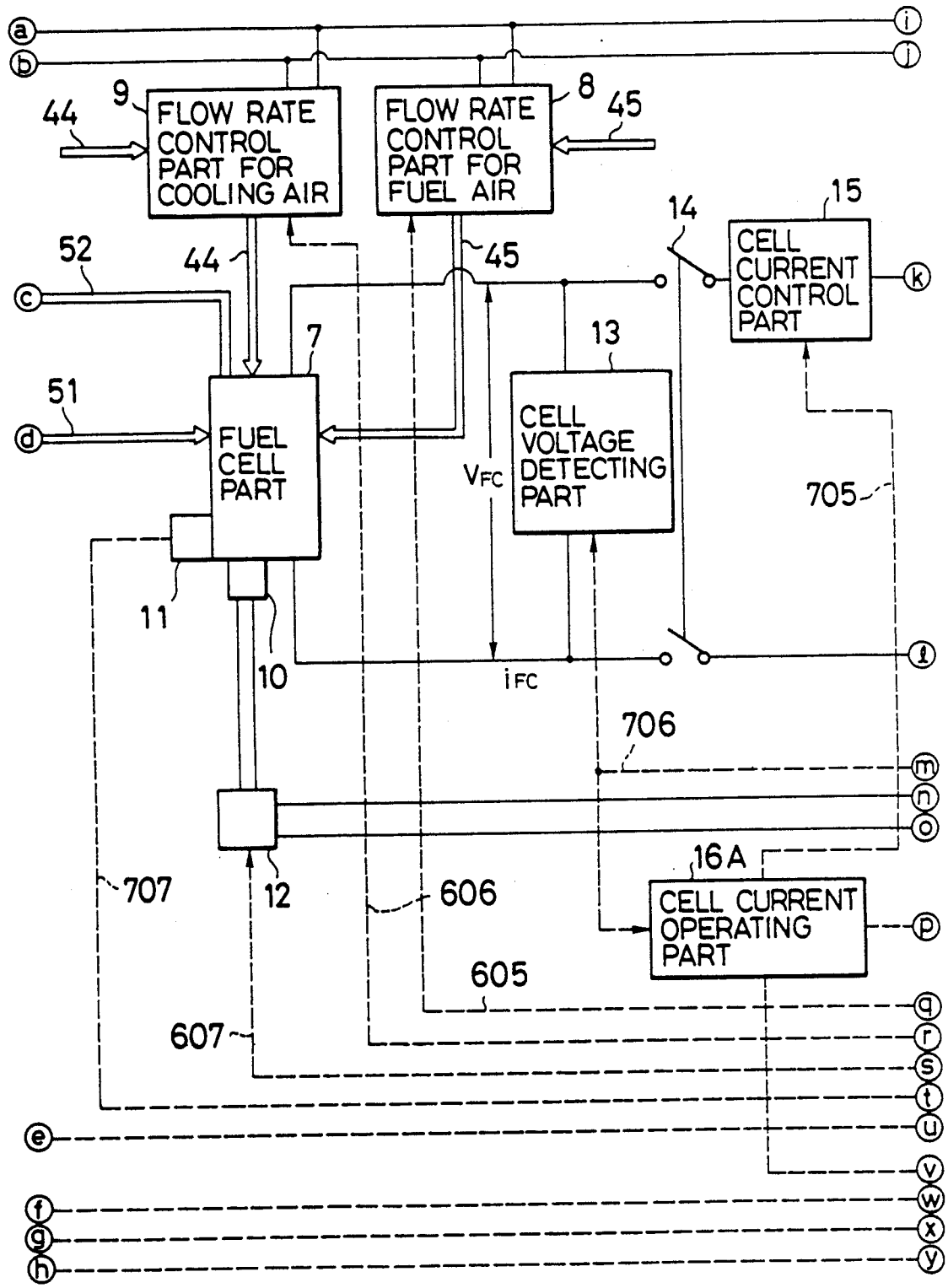
Figure 12C:
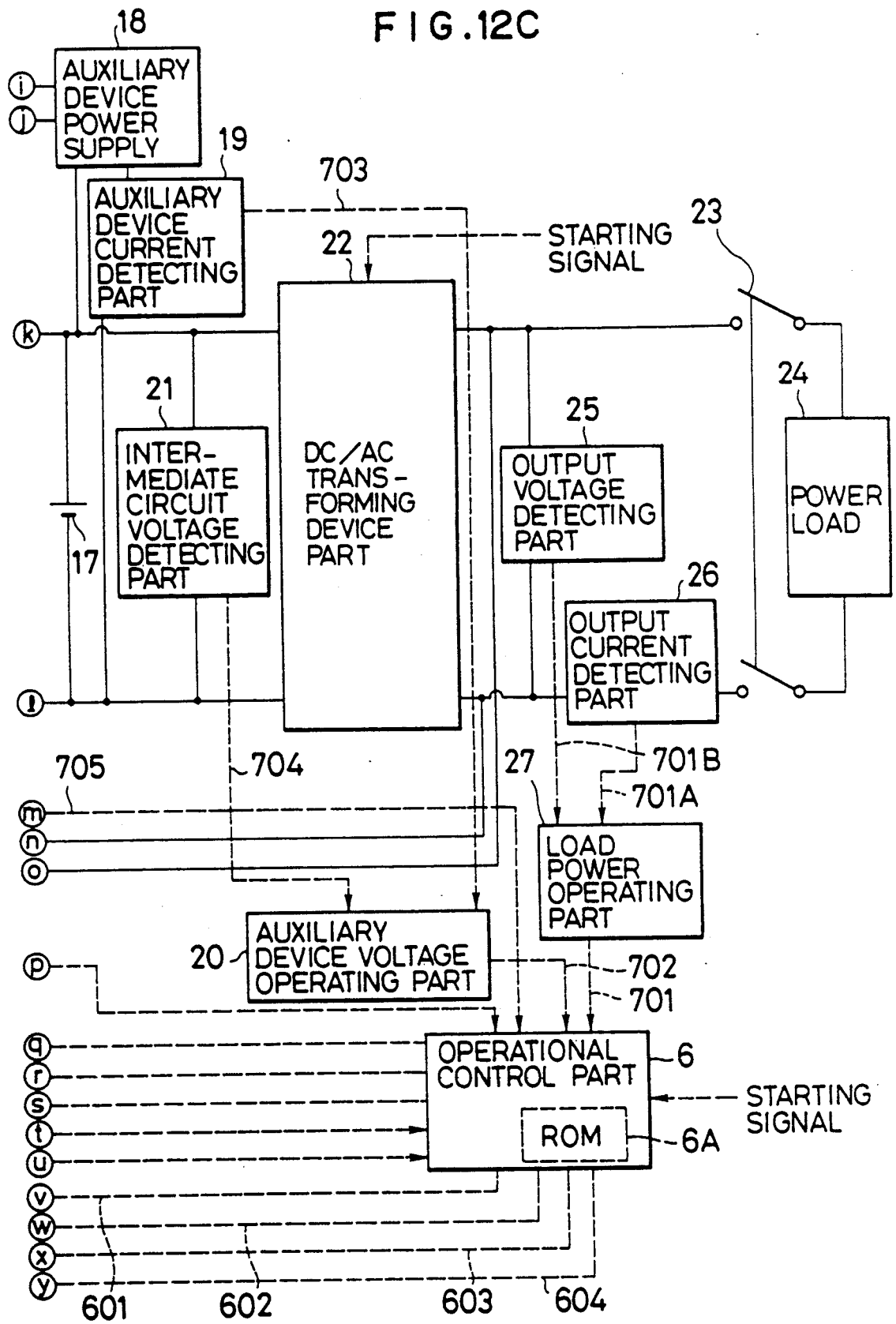
Figure 13:
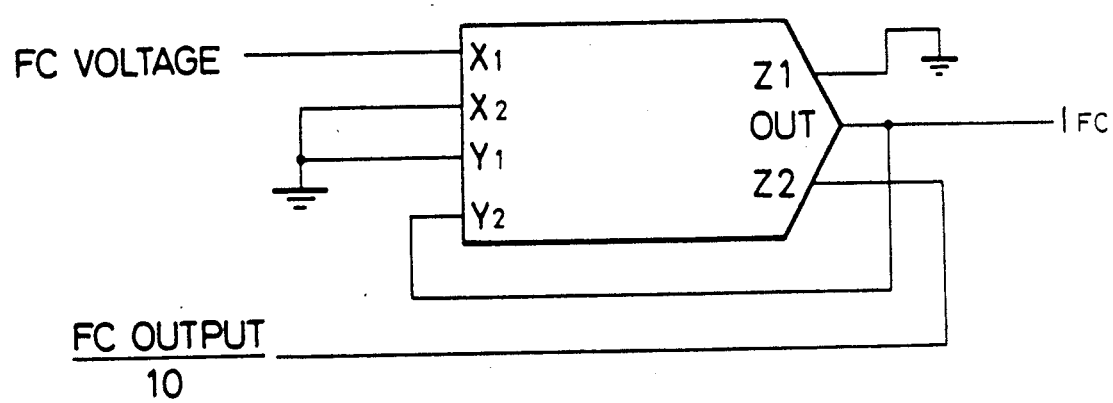
FIG. 13 is a diagram showing the construction of the cell current operating part shown in FIG. 12.

FIGS. 12A, 12B and 12C show a construction of another embodiment of the fuel cell generating apparatus according to the present invention. In FIG. 12A, 12B and 12C the same number is given to the same portion as that shown in FIG. 1A, 1B and 1C.

Reference numeral 16A represents a cell current operating part in the form of a divider, which calculates a cell current $I_{FC}$ from the first signal 601 outputted from the operational control part 6 and the cell voltage signal 706 outputted from the cell voltage detecting part and outputs a cell current signal 705 corresponding to the calculated value to the operational control part 6 and the cell current control part 15.

Figure 14:
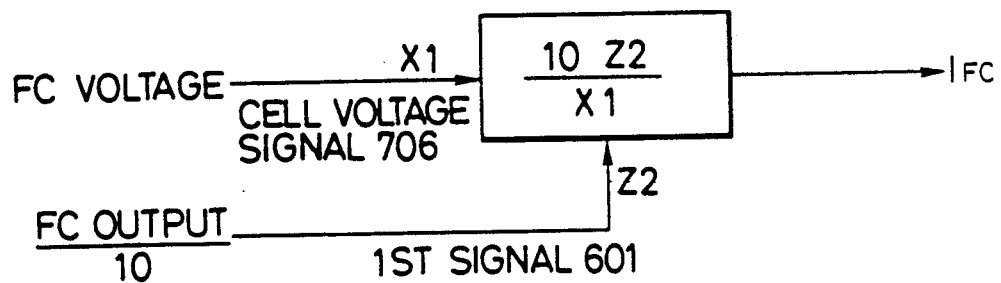
FIG. 14 is a diagram for illustrating the operation of the cell current operating part shown in FIG. 13.

The cell current operating part 16A is herein a divider MPY-100 (available from BURR-BROWN CO., LTD.). The transmission function is given by $10(Z2-Z1)/(X1-X2)$. Since Z1 and X2 are grounded, $Z1 = X2 = 0$. Thus, as shown in FIG. 14, $10Z2/X1$ is calculated from the cell voltage signal 706 and the first signal 601 and is outputted as $I_{FC}$.

An example of the control method in the foregoing fuel cell generating apparatus, in other words the flow of operational control in the operational control part 6 is one similar to those shown in FIGS. 7, 9 and 10. Thus, the control operations in the apparatus are the same as those employed in the control method 1 to 3 to control the fuel cell generating apparatus of the embodiment 1.

As has been explained above, in the embodiments of the fuel cell generating apparatus and the control methods according to the present invention, the amount of the starting material to be reformed, the reformed fuel and air supplied to various devices can automatically be controlled in proportion to the variations of, for instance, power load. In addition, the fuel cell apparatus can be controlled so that the increase in the electrode voltage of the fuel cell part 7 is prevented even when the power load is a low level of the order of almost zero.

INDUSTRIAL APPLICABILITY

According to the present invention, a fuel cell output following the variation in a power load can be obtained during the steady operation of a fuel cell generating apparatus. Moreover, the deterioration of electrodes due to the increase in the electrode voltage can be prevented even when the power load is a low level of the order of almost zero.

We claim:

1. A fuel cell power generating apparatus which comprises a fuel cell, a fuel reforming portion for generating a reformed fuel to be supplied to the fuel cell and a heating portion for heating the fuel cell, the fuel cell generating apparatus, comprising:

a first detecting means for detecting power supplied to a load;

an operational control means for operating an electric current command signal for leading out an electric current from said fuel cell based on a first detected signal outputted from said first detecting means; and a second detecting means for detecting an electric current outputted from said fuel cell based on said electric current command signal;

thereby the flow rate of a material which is fed to said fuel reforming portion to produce said reformed fuel being controlled on the basis of a control signal obtained by processing a second signal detected by said second detecting means with said processing means and an electric power being supplied to said heating portion on the basis of said first signal detected by said first detecting means.

2. The fuel cell generating apparatus as claimed in claim 1, wherein said first detecting means comprises an output voltage detecting part for detecting a voltage between both ends of said load, an output current detecting part for detecting a current passing through said load and a load power processing part.

3. The fuel cell generating apparatus as claimed in claim 2, wherein said load power processing part is in the form of an AC transducer.

4. The fuel cell generating apparatus as claimed in claim 2, wherein said output current detecting part is in the form of a Hall CT.

5. The fuel cell generating apparatus as claimed in claim 2, wherein said output current detecting part is in the form of a shunt.

6. The fuel cell generating apparatus as claimed in claim 1, wherein said second detecting means is in the form of a Hall CT.

7. The fuel cell generating apparatus as claimed in claim 1, wherein said control of the flow rate of said material for producing said reformed fuel is performed by a controlling means which comprises an operating device, a pulse width modulator and a power element.

8. The fuel cell generating apparatus as claimed in claim 7, wherein said operating device comprises a function generator in the form of a CPU, an operational amplifier and a resistor.

9. A fuel cell power generating apparatus which comprises a fuel cell, a fuel reforming portion for generating a reformed gas to be supplied to the fuel cell and a heating portion for heating the fuel cell, the fuel cell generating apparatus, comprising:
a first detecting means for detecting power supplied to a load;
an operational control means for operating an electric power command signal for leading out an electric power from said fuel cell based on a first signal detected by said first detecting means; and
a current operating means for operating a current command signal for use in leading out a current from said fuel cell based on said electric power command signal;
thereby the flow rate of a material which is fed to said fuel reforming portion to produce said reformed fuel being controlled on the basis of a control signal obtained by processing a current command signal operated by said current operating means with said processing means and an electric power being supplied to said heating portion on the basis of said first signal detected by said first detecting means.

10. The fuel cell generating apparatus as claimed in claim 9, wherein said first detecting means comprises an output voltage detecting part for detecting a voltage between both ends of said load, an output current detecting part for detecting a current passing through said load and a load power processing part.

11. The fuel cell generating apparatus as claimed in claim 10, wherein said load power processing part is in the form of an AC transducer.

12. The fuel cell generating apparatus as claimed in claim 10, wherein said output current detecting part is in the form of a Hall CT.

13. The fuel cell generating apparatus as claimed in claim 10, wherein said output current detecting part is in the form of a shunt.

14. The fuel cell generating apparatus as claimed in claim 9, wherein said current operating means is in the form of a divider.

15. The fuel cell generating apparatus as claimed in claim 9, wherein said control of said flow rate of said material for producing said reformed fuel is performed by a controlling means which comprises an operating device, a pulse width modulator and a power element.

16. The fuel cell generating apparatus as claimed in claim 15, wherein said operating device comprises a function generator in the form of a CPU, an operational amplifier and a resistor.

17. A method for controlling a fuel cell power generating apparatus comprising a fuel cell, a fuel reforming portion for generating a reformed fuel to be supplied to the fuel cell and a heating portion for heating the fuel cell, said method comprising the steps of:
a first detecting step for detecting an electric power supplied to a load;
controlling an operation of a current command signal for leading out a current from said fuel cell on the basis of a first signal detected by said first detecting means; and
a second detecting step for detecting a current outputted from said fuel cell based on the current command signal;
thereby a flow rate of a material which is fed to said fuel reforming portion to produce said reformed fuel being controlled on the basis of a control signal obtained by processing a second signal detected by said second detecting step through said processing step and an electric power being supplied to said heating portion on the basis of said first signal detected through said first detecting step.

18. The method for controlling the fuel cell generating apparatus as claimed in claim 17, wherein said first detecting step comprises a detecting step by means of an output voltage detecting part for detecting said voltage across said load, a detecting step by means of an output current detecting part for detecting a current passing through said load and an operating step by means of a load power operating part.

19. The method for controlling the fuel cell generating apparatus as claimed in claim 18, wherein said load power operating part is in the form of an AC transducer.

20. The method for controlling the fuel cell generating apparatus as claimed in claim 18, wherein said output current detecting part may be in the form of a Hall CT.

21. The method for controlling the fuel cell generating apparatus as claimed in claim 18, wherein said output current detecting part may be in the form of a shunt.

22. The method for controlling the fuel cell generating apparatus as claimed in claim 17, wherein said detecting means in said second detecting step is in the form of a Hall CT.

23. The method for controlling the fuel cell generating apparatus as claimed in claim 17, wherein a control of a flow rate of said material for producing said reformed fuel is performed by a controlling means which comprises an operating device, a pulse width modulator and a power element.

24. The method for controlling the fuel cell generating apparatus as claimed in claim 23, wherein said operating device comprises a function generator in the form of a CPU, an operational amplifier and a resistor.

25. A method for controlling a fuel cell power generating apparatus comprising a fuel cell, a fuel reforming portion for generating a reformed gas to be supplied to the fuel cell and a heating portion for heating the fuel cell, said method comprising the steps of:
- a first detecting step for detecting an electric power supplied to a load;
- an operational control step for operating an electric power command signal for outputting an electric power from said fuel cell on the basis of a first signal detected by said first detecting step; and
- operating a current command signal for leading out a current from said fuel cell based on said electric power command signal;
- thereby the flow rate of a material which is fed to said fuel reforming portion to produce the reformed fuel being controlled on the basis of a control signal obtained by operating said current command signal processed by said current operating means through said processing step and an electric power being supplied to said heating portion on the basis of said first signal detected through the first detecting step.

26. The method for controlling the fuel cell generating apparatus as claimed in claim 25, wherein said first detecting step comprises a detecting step by means of an output voltage detecting part for detecting a voltage across said detecting step by means of an output current detecting part for detecting a current passing through said load and an operating step by means of a load power operating part.

27. The method for controlling the fuel cell generating apparatus as claimed in claim 26, wherein said load power operating part is in the form of an AC transducer.

28. The method for controlling the fuel cell generating apparatus as claimed in claim 26, wherein said output current detecting part is in the form of a Hall CT.

29. The method for controlling the fuel cell generating apparatus as claimed in claim 26, wherein said output current detecting part is in the form of a shunt.

30. The method for controlling the fuel cell generating apparatus as claimed in claim 25, wherein said current operating means is in the form of a divider.

31. The method for controlling the fuel cell as claimed in claim 25, wherein a control of a flow rate of said material for producing said reformed fuel is performed by a controlling means which comprises an operating device, a pulse width modulator and a power element.

32. The method for controlling the fuel cell as claimed in claim 31, wherein said operating device comprises a function generator in the form of a CPU, an operational amplifier and a resistor.

33. A method for controlling a fuel cell to which a reformed fuel is supplied, said method comprising the steps of:
- outputting an electric power to a heating portion for heating said fuel cell and simultaneously computing a current outputted from said fuel cell based on a predetermined electric power and an electric power for charging a secondary battery when said value obtained by subtracting an electric power supplied to a load from said predetermined power based on properties of said fuel cell is positive;
- computing a current outputted from said fuel cell on the basis of said electric power supplied to said load and said power for charging said secondary battery which backs up said fuel cell when said subtraction value is not positive; and
- supplying, to a fuel reforming device, a material for producing a fuel corresponding to said calculated value, for supplying an electric power outputted from said fuel cell to said secondary battery and for controlling said cell so that an output therefrom becomes not less than said predetermined electric power.

34. A method for controlling a fuel cell to which a reformed fuel is supplied, said method comprising the steps of:
- outputting an electric power to a heating portion for heating said fuel cell and simultaneously computing a current outputted from said fuel cell based on a predetermined electric power when said value obtained by subtracting an electric power supplied to a load from said predetermined power based on properties of said fuel cell is positive;
- computing a current outputted from said fuel cell on said basis of said electric power supplied to said load when said subtraction value is not positive; and
- supplying a material for producing a fuel to a fuel reforming device corresponding to said calculated value and for controlling said fuel cell so that an output therefrom becomes not less than said predetermined electric power.

35. A method for controlling a fuel cell to which a reformed fuel is supplied, said method comprising the steps of:
- computing a current outputted from said fuel cell from a predetermined electric power based on properties of said fuel cell; and
- supplying a material for producing a fuel corresponding to said calculated value and for calculating an electric power outputted to a heating portion for heating said fuel cell based on a predetermined electric power and an electric power for charging a secondary battery which back up said fuel cell; and, during steady operation;
- outputting an electric power to said heating portion and simultaneously calculating an output current of said fuel cell on the basis of a predetermined electric power and said power for charging said secondary battery when said subtraction value obtained by subtracting an electric power supplied to a load from the predetermined power is positive;
- while if said subtraction value is not positive, said method comprising a step of calculating an output current of said fuel cell based on said power supplied to said load and said power for charging said secondary battery; and
- supplying a material for producing a fuel to a fuel reforming device corresponding to said calculated value, for supplying said output power from said fuel cell to said secondary battery and for controlling said fuel cell so that an output therefrom becomes not less than said predetermined electric power.

* * * * *